United States Patent
Myers

(10) Patent No.: US 12,326,559 B1
(45) Date of Patent: Jun. 10, 2025

(54) SYSTEM FOR PROVIDING CHECKLISTS TO A PILOT

(71) Applicant: Max Myers, Naples, FL (US)

(72) Inventor: Max Myers, Naples, FL (US)

( * ) Notice: Subject to any disclaimer, the term of this patent is extended or adjusted under 35 U.S.C. 154(b) by 0 days.

(21) Appl. No.: 18/954,074

(22) Filed: Nov. 20, 2024

Related U.S. Application Data

(60) Provisional application No. 63/693,239, filed on Sep. 11, 2024.

(51) Int. Cl.
*G06F 3/0482* (2013.01)
*G02B 27/01* (2006.01)

(52) U.S. Cl.
CPC ....... *G02B 27/0101* (2013.01); *G06F 3/0482* (2013.01); *G02B 2027/0141* (2013.01)

(58) Field of Classification Search
CPC ........ G02B 27/0101; G02B 2027/0141; G06F 3/0482
See application file for complete search history.

(56) References Cited

U.S. PATENT DOCUMENTS

| | | | | |
|---|---|---|---|---|
| 4,970,683 | A * | 11/1990 | Harshaw | G06F 15/0283 701/14 |
| 5,454,074 | A * | 9/1995 | Hartel | B64G 1/22 701/14 |
| 9,171,273 | B2 | 10/2015 | Thomas | |
| 2001/0030611 | A1* | 10/2001 | O'Rourke | G06Q 10/10 340/4.4 |
| 2008/0294988 | A1* | 11/2008 | Nicholas | G06Q 10/109 715/710 |
| 2012/0209468 | A1* | 8/2012 | Thomas | G07C 5/006 701/32.4 |
| 2016/0110776 | A1* | 4/2016 | Pratt | G07F 17/3223 463/28 |

(Continued)

FOREIGN PATENT DOCUMENTS

WO  WO-2017021934 A1 * 2/2017

OTHER PUBLICATIONS

"Redefining Safety", website: https://www.missionarybushpilot.com/checklistbox.

*Primary Examiner* — Anil K Bhargava
(74) *Attorney, Agent, or Firm* — Derek Fahey, Esq.; The Plus IP Firm, PLLC

(57) ABSTRACT

The present invention is a checklist management system designed to improve the efficiency, accuracy, and safety of pilot operations. The system features a touchscreen display disposed in a horizontal manner, allowing intuitive, gesture-based interaction for navigating tasks and switching between checklists. Integrated audio output provides real-time alerts for incomplete tasks, enabling pilots to maintain situational awareness while following procedures. The system also includes a processor for executing checklist management software, a wireless communication module for remote updates and data synchronization, and various input devices like dials and buttons for precise control. Additionally, the system supports customizable airplane profiles and emergency checklist prioritization, enabling tailored checklist execution across different flight phases. This comprehensive design addresses the limitations of prior art, providing a user-friendly, adaptive solution that enhances both routine and emergency checklist compliance.

12 Claims, 16 Drawing Sheets

(56) References Cited

U.S. PATENT DOCUMENTS

| | | | | |
|---|---|---|---|---|
| 2016/0371624 | A1* | 12/2016 | Breitschwerdt | G06Q 10/06395 |
| 2017/0210484 | A1* | 7/2017 | Figard | G06Q 10/06316 |
| 2019/0057486 | A1* | 2/2019 | Kumar | G06F 3/011 |
| 2019/0202577 | A1* | 7/2019 | Le Provost | B64D 43/00 |
| 2019/0266814 | A1* | 8/2019 | Huang | G06F 3/0482 |
| 2021/0333806 | A1* | 10/2021 | Urbanec | B64D 43/00 |
| 2022/0009651 | A1* | 1/2022 | Lampazzi | B64D 45/00 |
| 2022/0269381 | A1* | 8/2022 | Conaway | G06F 9/453 |

* cited by examiner

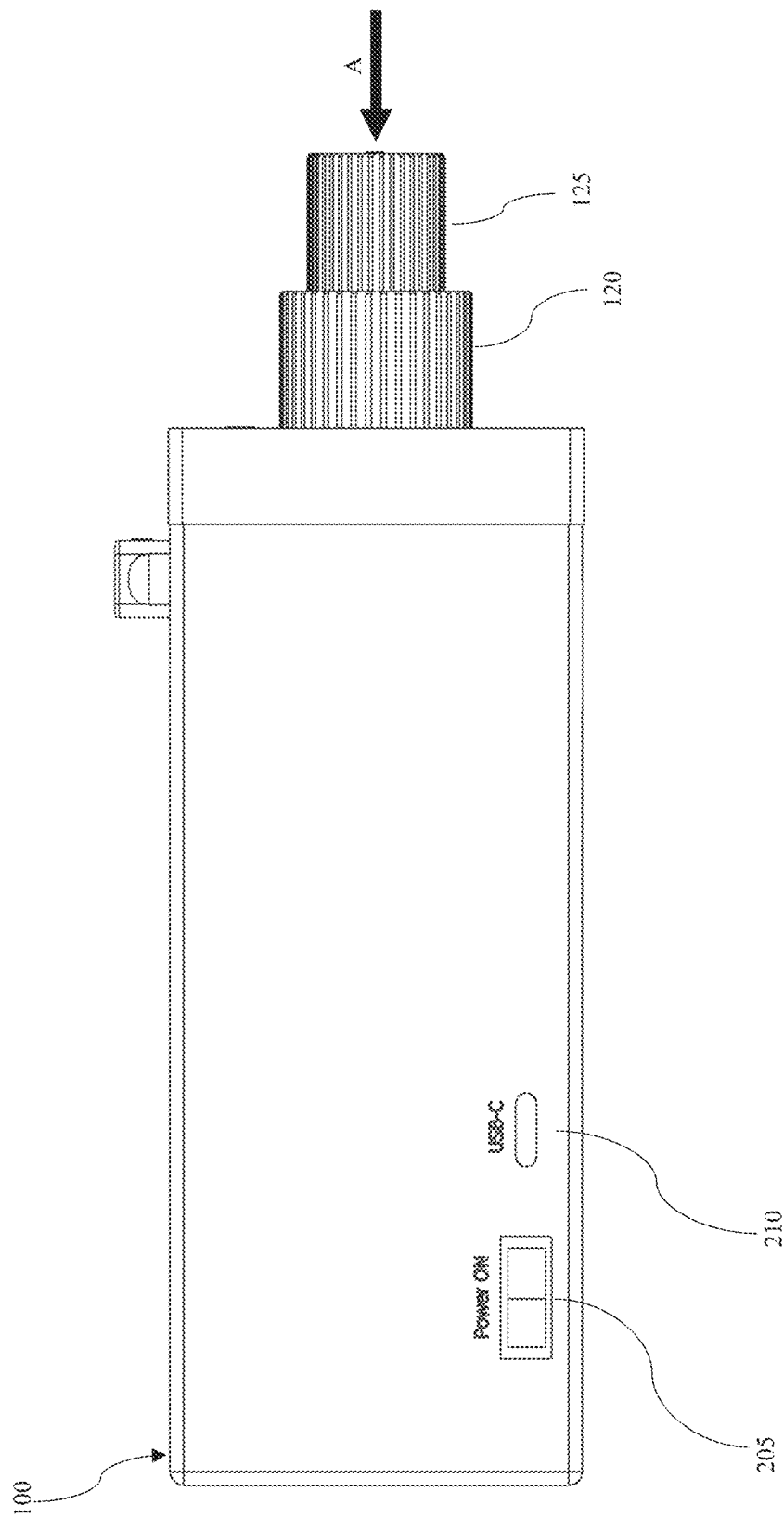

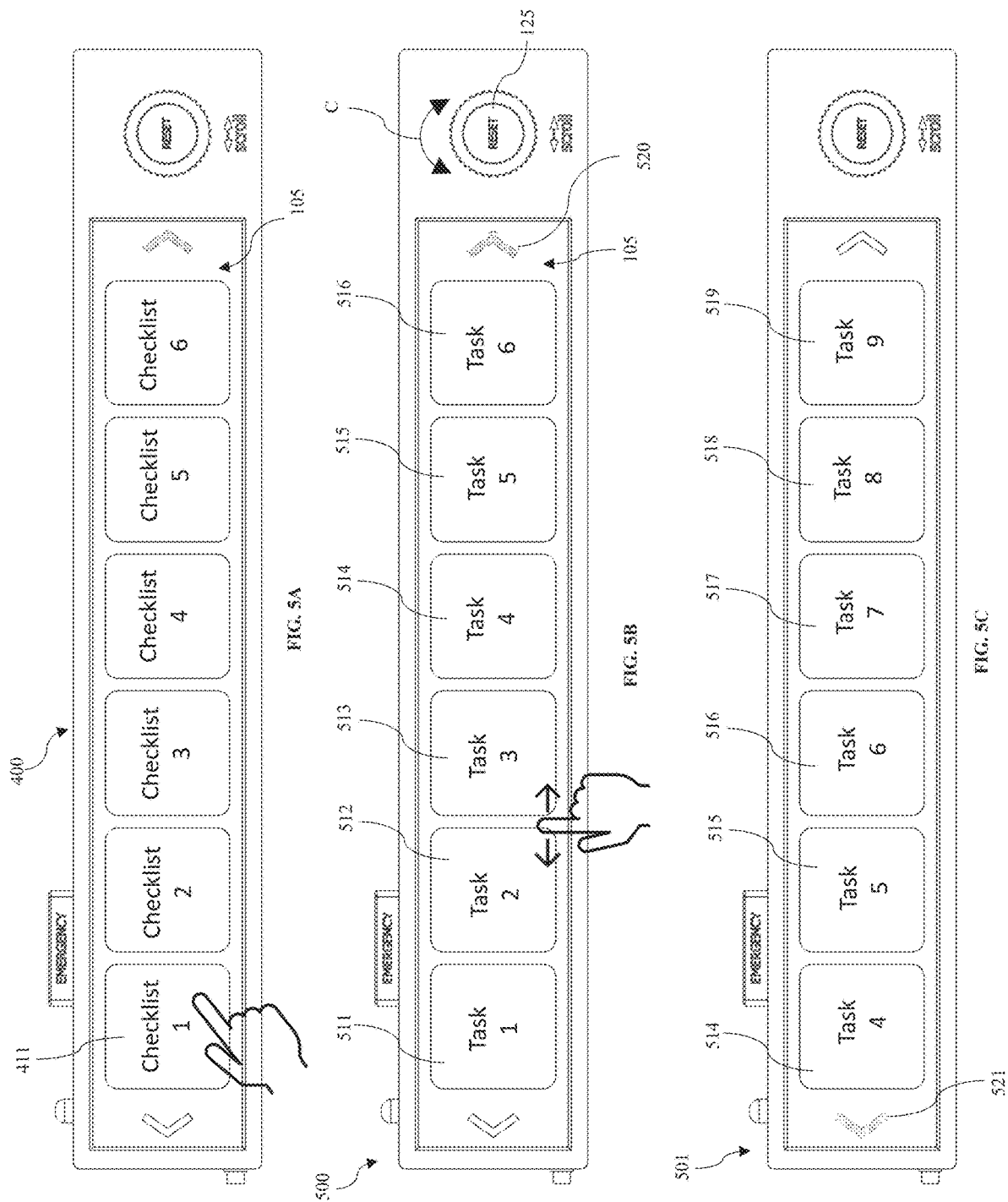

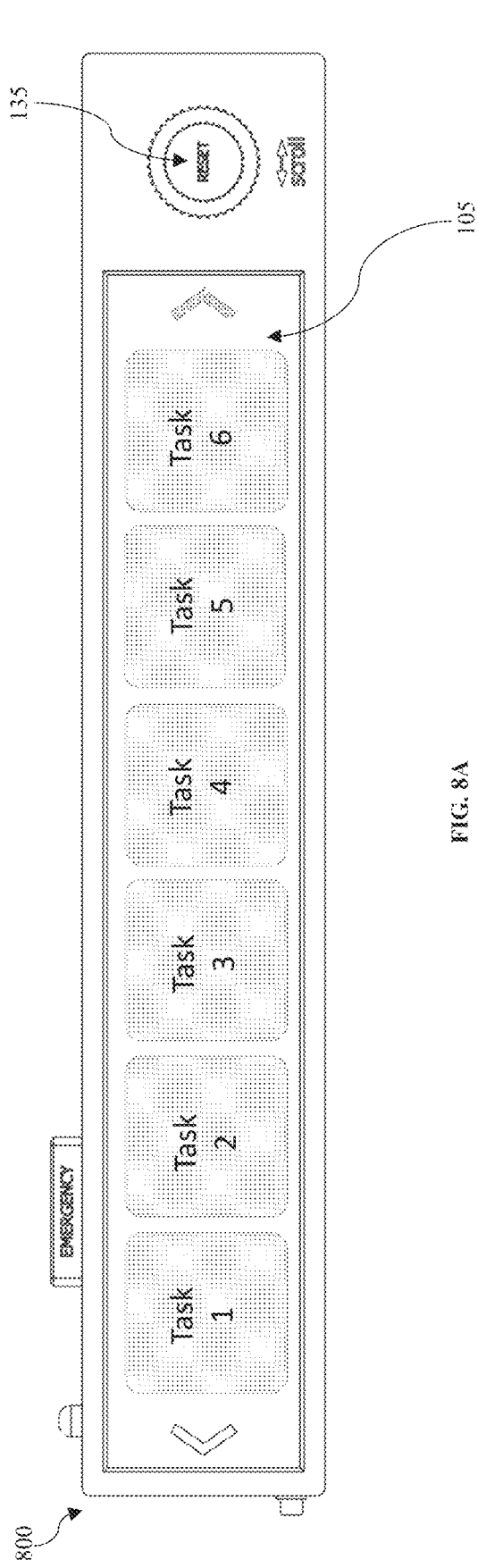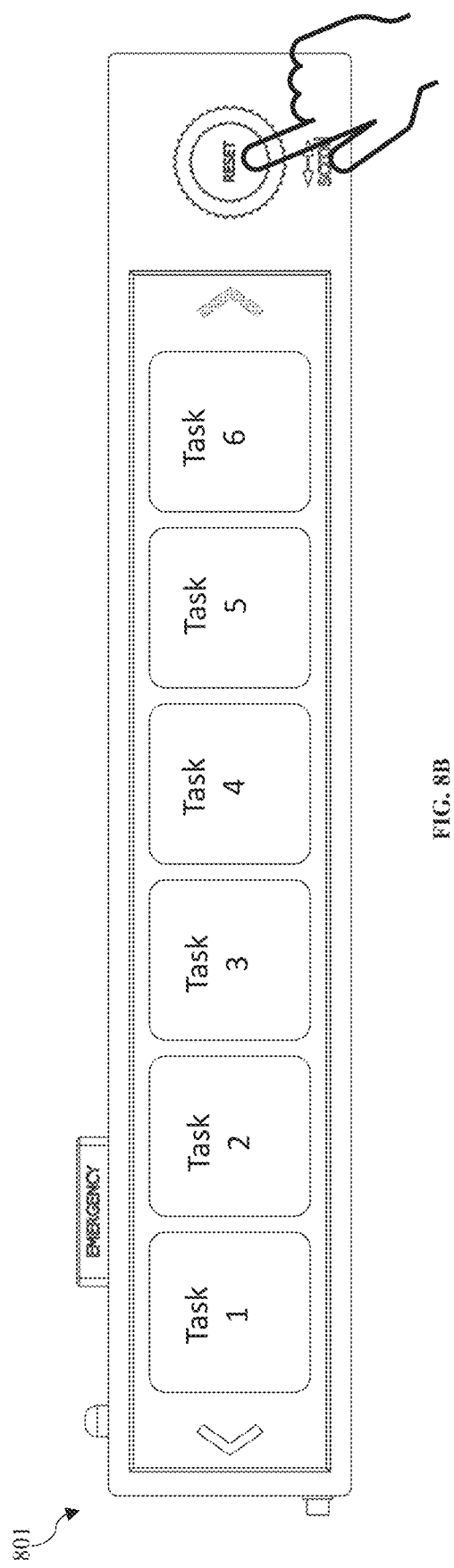
FIG. 8A
FIG. 8B

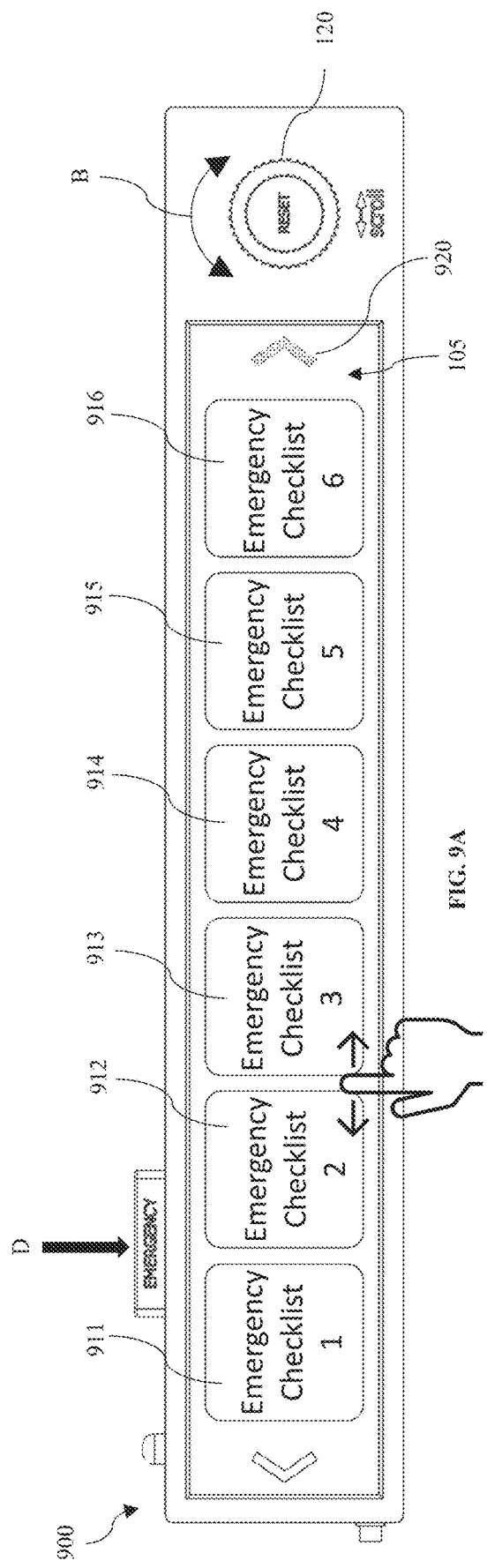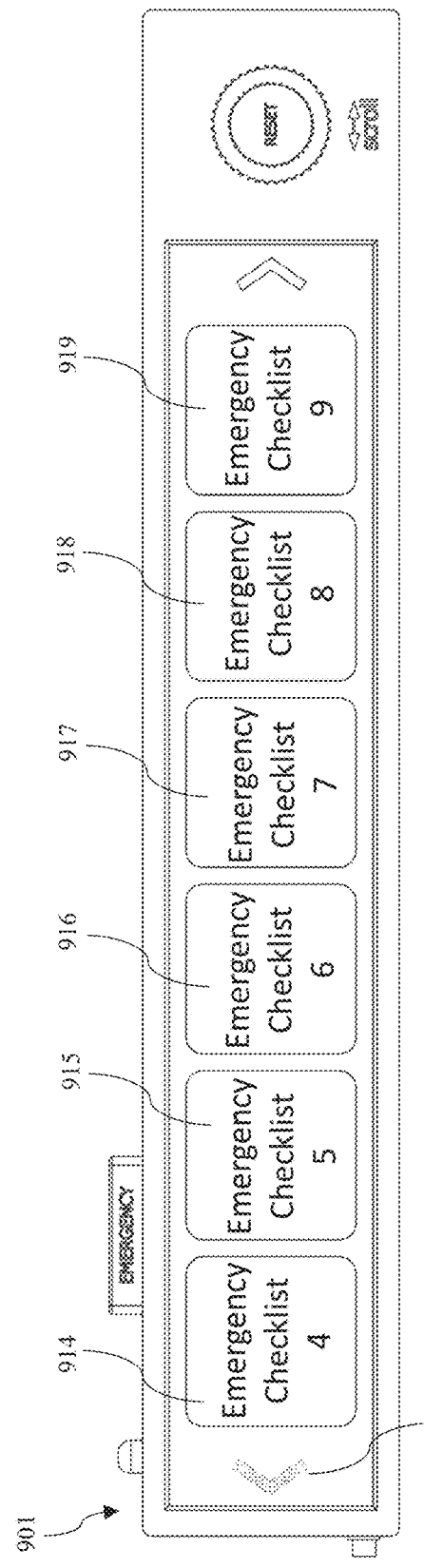
FIG. 9A
FIG. 9B

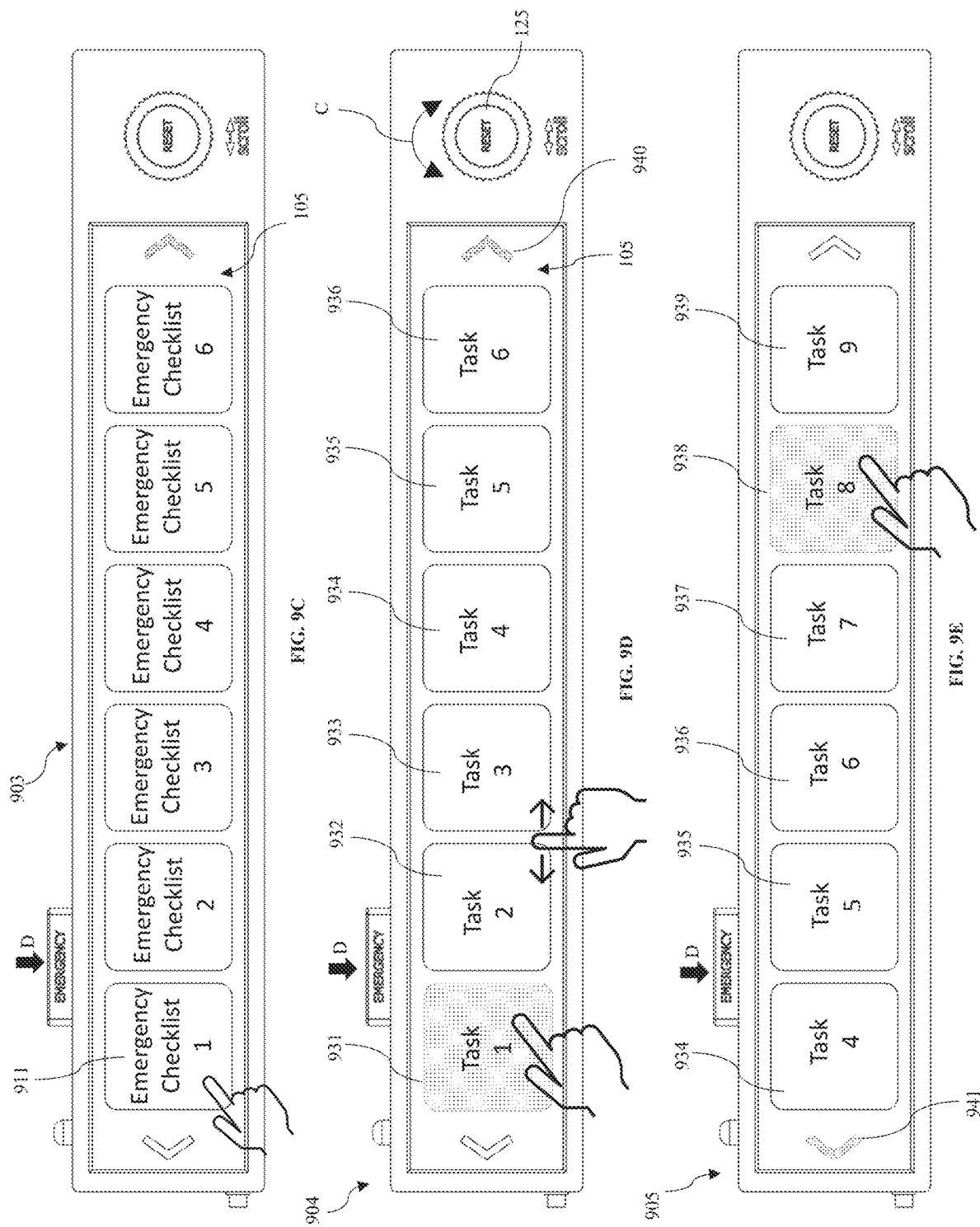

SYSTEM FOR PROVIDING CHECKLISTS TO A PILOT

REFERENCE TO RELATED APPLICATIONS

This application is a Non-Provisional Application which claims the benefit and priority to the filing date of U.S. Provisional Application Ser. No. 63/693,239 titled "ELECTRONIC CUSTOMIZABLE CHECKLIST DEVICE FOR PILOTS" and filed Sep. 11, 2024, and the subject matter of which is incorporated herein by reference.

CROSS-REFERENCES

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISK

Not applicable.

TECHNICAL FIELD

The present disclosure relates to the field of aviation safety systems, and more specifically to a checklist management system for pilots.

BACKGROUND OF THE INVENTION

In aviation, checklists are essential tools used by pilots to ensure that critical tasks and procedures are properly executed throughout various flight phases. The Federal Aviation Administration (FAA) mandates the use of these checklists as part of standard operating procedures, covering everything from pre-flight checks and takeoff preparations to in-flight operations, landing, and post-flight inspections. These checklists play a critical role in enhancing safety, reducing human error, and maintaining operational consistency.

Despite their importance, traditional paper-based checklists pose several challenges. In low-light conditions, during turbulence, or in time-sensitive scenarios, paper checklists can be difficult to read, leading to missed or incomplete tasks. Additionally, the physical handling of paper checklists can create distractions, causing interruptions that may compromise a pilot's focus and task management. In emergency situations, finding and referencing the correct checklist on paper can be particularly challenging, as pilots must act swiftly and decisively.

While digital checklist solutions have been introduced, they often have limitations. Many existing devices lack real-time adaptability, are not customizable, or are designed for use with only one specific aircraft and only a single checklist. This limits their effectiveness in supporting pilots who operate multiple aircraft types with distinct procedural requirements. Additionally, many digital systems offer minimal interaction capabilities, making it difficult for pilots to efficiently navigate between tasks, receive auditory feedback, or manage checklists in real-time.

As a result, there exists a need for improvements over the prior art and more particularly for an improved system that provides pilots with a more efficient, customizable, and user-friendly way to manage a plurality of checklists across multiple aircraft. Such a system should include a touch-screen display, audio alerts, and a wireless communication module to allow for seamless data transfer and remote management. The present invention aims to fulfill these needs, offering a comprehensive, standalone solution that enhances both safety and operational efficiency in the cockpit.

BRIEF SUMMARY OF THE INVENTION

A system for providing a plurality of checklists to a pilot is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for providing a plurality of checklists to a pilot is disclosed. The system comprises a housing that encloses a plurality of system components, protecting and organizing the internal elements. It includes a power source that supplies electrical energy to all system components. A processor is in electrical communication with the power source, enabling it to control system operations and execute software instructions. A database is in connection with the processor and is configured to store a plurality of checklists, airplane profiles, and event logs. The system also includes a wireless communication module that facilitates data transfer between the processor and a remote computing device, enabling real-time updates and synchronization. An interface is provided, connected to the processor, which allows the user to input commands related to the plurality of checklists and airplane profiles. Additionally, a graphical display is incorporated to present a first checklist from the plurality of checklists visually. An audio output means is connected to the processor, designed to deliver audio feedback to the pilot, enhancing situational awareness. The processor is configured to execute a set of software instructions for managing and displaying the plurality of checklists in relation to each of the airplane profiles, ensuring efficient checklist management throughout various phases of flight.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIG. 2 is a side view of a housing for a system for providing a plurality of checklists to a pilot, according to an example embodiment;

FIGS. 5A-5C are a graphical representation of an operation of a system for providing a plurality of checklists to a pilot, according to an example embodiment;

FIGS. 8A and 8B are a graphical representation of an operation of a system for providing a plurality of checklists to a pilot, according to an example embodiment;

FIGS. 9A-9E are a graphical representation of an operation of a system for providing a plurality of checklists to a pilot, according to an example embodiment;

DETAILED DESCRIPTION

Figure 1:
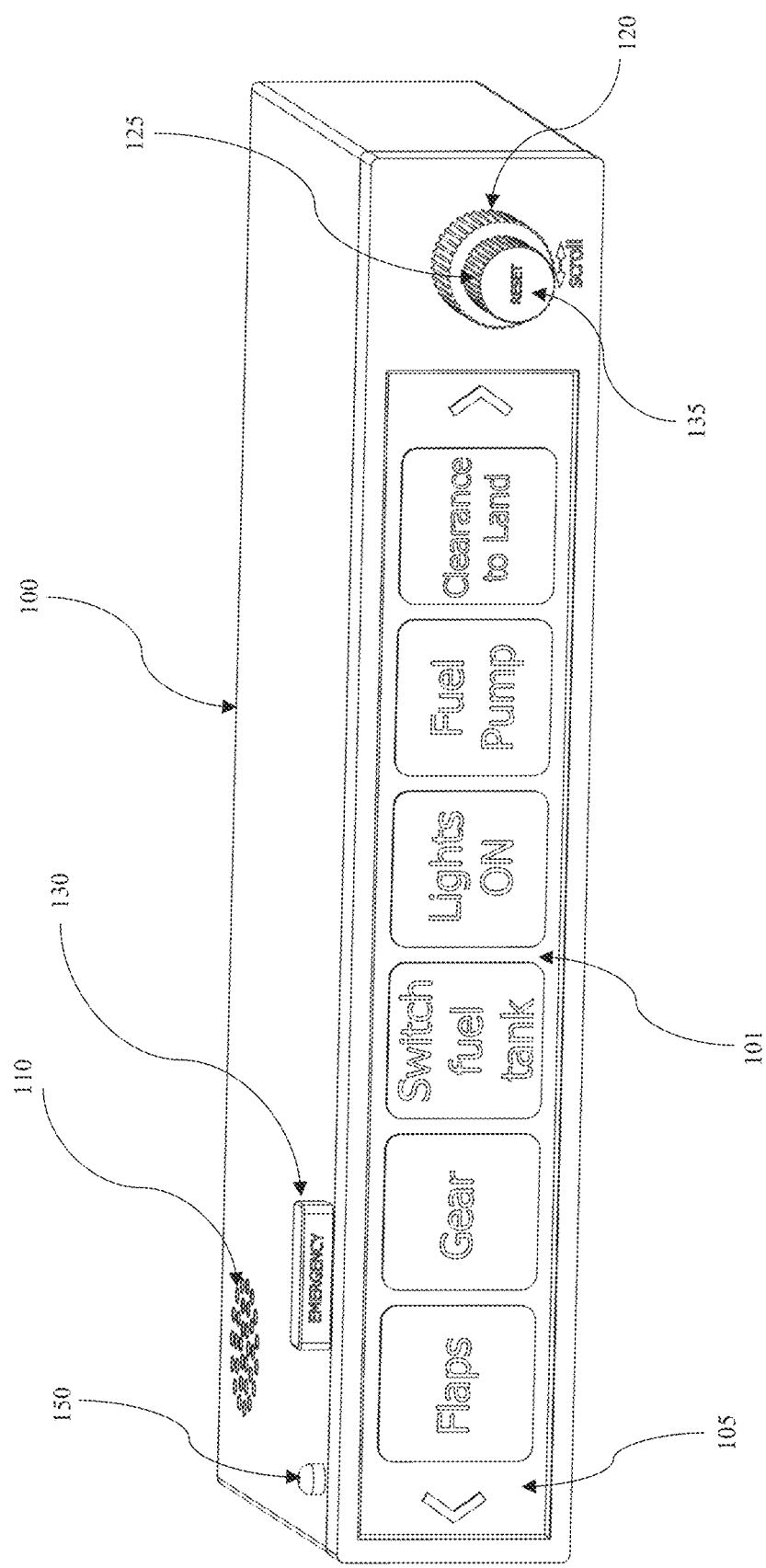
FIG. 1 is a perspective view of a housing for a system for providing a plurality of checklists to a pilot, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system providing an integrated, user-friendly system that enhances the efficiency and accuracy of checklist management for pilots. Unlike traditional paper-based or limited digital checklists, this system incorporates a graphical touchscreen display that presents checklists and tasks in a clear, organized format. This configuration improves visibility, especially in low-light or turbulent conditions, reducing the likelihood of missed tasks. The horizontal manner of the touchscreen further enhances ease of use, allowing for intuitive, gesture-based interactions that facilitate seamless navigation between tasks and checklists.

Additionally, the system's audio output means offers real-time auditory feedback, alerting pilots to incomplete tasks or prompting them to proceed to the next task. This reduces the need for constant visual reference, allowing pilots to maintain situational awareness while ensuring checklist compliance. The incorporation of a wireless communication module enables seamless data transfer between the system and remote computing devices, allowing for real-time updates, remote checklist modifications, and synchronization of data logs. This connectivity ensures that pilots have access to the most up-to-date checklists, which can be tailored to specific airplane profiles and operational needs.

The system's processor executes software instructions to manage and display checklists based on user input, facilitating efficient switching between normal procedures and emergency checklists. This is further supported by user input devices such as dials, buttons, and an interface that offer precise control over task selection, status updates, and emergency operations, enabling pilots to quickly access and manage critical procedures. The combination of these elements results in a reliable, adaptable, and comprehensive checklist management system that not only minimizes human error but also enhances safety and operational efficiency across all flight phases.

Referring now to the Figures, FIGS. 1 and 2 illustrate a housing 100 for a system for providing a plurality of checklists to a pilot. The housing comprises an interface 101, audio output means 110, and a strobe light emitting apparatus 150. The interface 101 comprises a graphical display 105, a first dial 120, a second dial 125 disposed on the first dial that also functions as a reset push button 135, an emergency push button 130. The housing may further comprise a power switch 205 and at least one universal port 210. To operate the reset push button 135, the user pilot can depress the button is the direction A as illustrated in FIG. 2. In relation to the emergency push button, reset push button, and any additional buttons, the terms "press(ed)(ing)" and "depress(ed)(ing)" are interchangeable and refer to the action of pressing or pushing down on a button or control mechanism on the device. When a button is "pressed" or "depressed," it triggers a specific function by engaging an underlying switch or sensor. The button may or may not return to its original position after being depressed, depending on the design and function of the specific control. In some cases, the button is momentary and automatically returns to its normal, unpressed state once released. In other cases, the button may remain in a depressed position until it is actively reset or released by the user or system, indicating a maintained activation state. This flexibility allows for different operational functions depending on whether a single press or sustained engagement is required. These components are discussed in greater detail below.

Figure 3A:
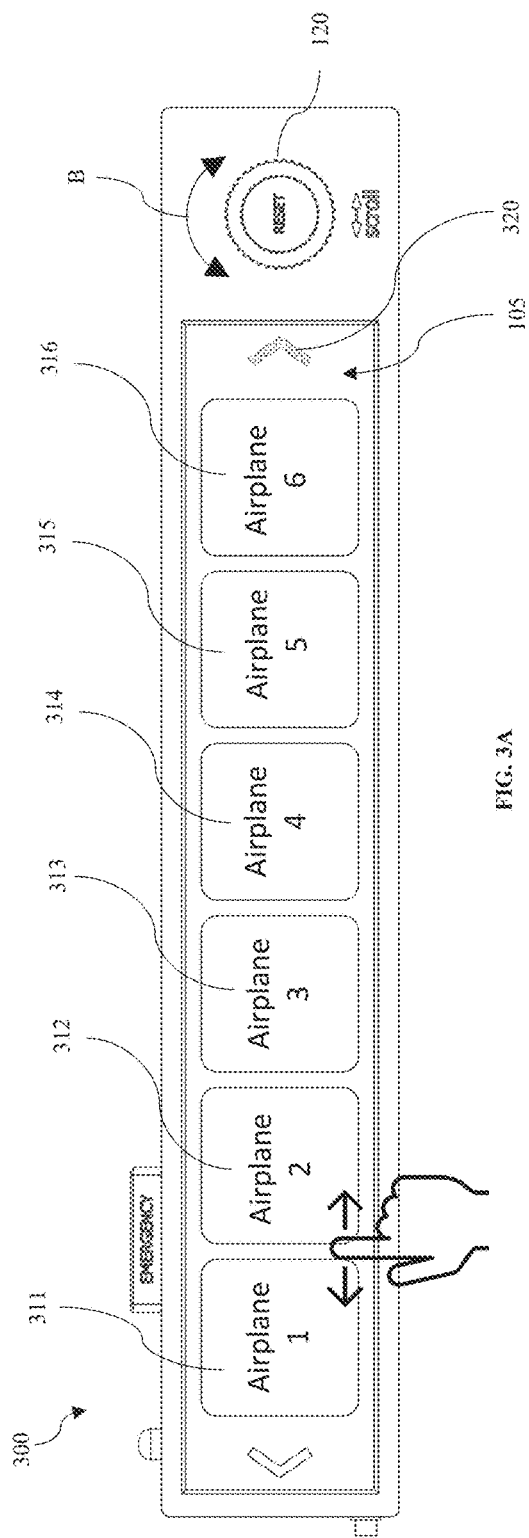
FIGS. 3A and 3B are a graphical representation of an operation of a system for providing a plurality of checklists to a pilot, according to an example embodiment.
Figure 3B:
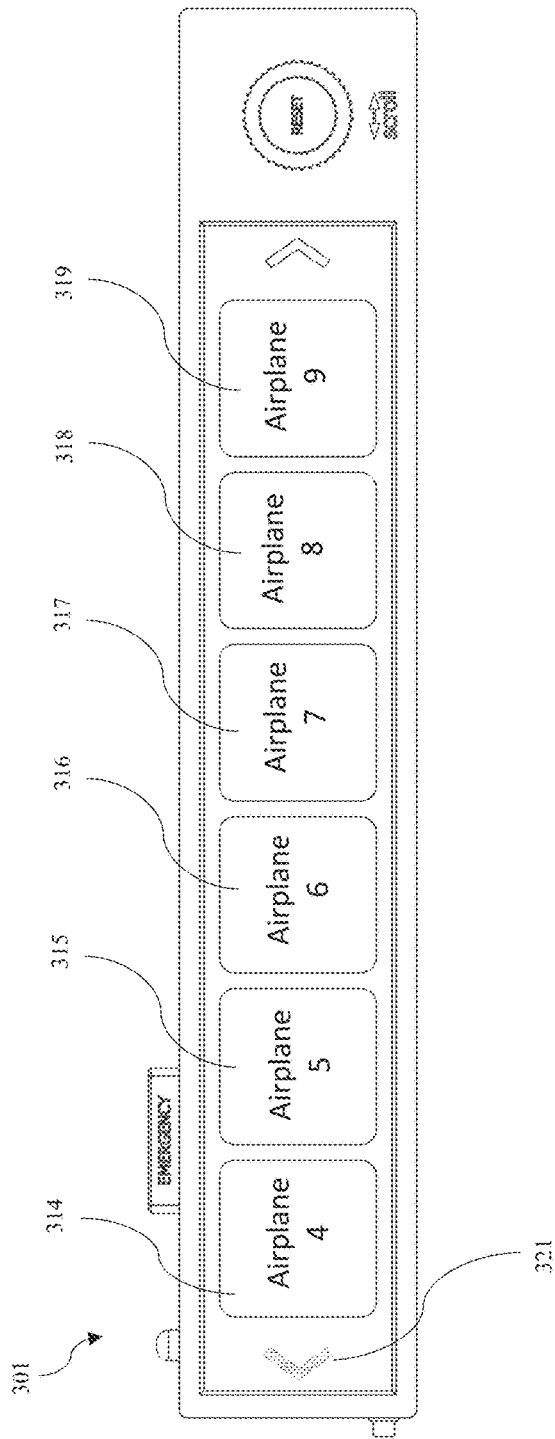

FIGS. 3A and 3B illustrate an operation of a system for providing a plurality of checklists to a pilot. The graphical display 105 is displaying a graphical representation 300 of a plurality of airplane profiles, wherein, the plurality of airplane profiles includes a first airplane profile 311, second airplane profile 312, third airplane profile 313, fourth airplane profile 314, fifth airplane profile 315, and sixth airplane profile 316. When the first dial 120 is rotated in a direction B, the graphical display 105 switches to displaying a graphical representation 301, wherein, the first airplane profile, second airplane profile 312, and third airplane profile 313 are now hidden from the screen, and a seventh airplane profile 317, eight airplane profile, 318, and ninth airplane profile 319 now appear. Indicators 320, 321 will light up to notify a pilot about the existence of hidden profiles. In example embodiments, the indicators 320, 321 are graphical representations of arrows, wherein, the arrow signifies which direction the first knob needs to be turned in order to reveal the hidden profiles. In FIG. 3A, indicator 320 is lit (denoted by shading), indicating that there are hidden airplane profiles, in this case the hidden airplane profiles are the seventh airplane profile 317, eight airplane profile, 318, and ninth airplane profile 319. Conversely, in FIG. 3B, indicator 321 is lit, indicating that there are hidden airplane profiles, in this case the hidden airplane profiles are the first airplane profile 311, second airplane profile 312, and third airplane profile 313. The user pilot may also use gesture inputs such as swiping a portion of the touchscreen of the graphical display 105 to scroll between profiles. This operation will be discussed in greater detail below.

Figure 4A:
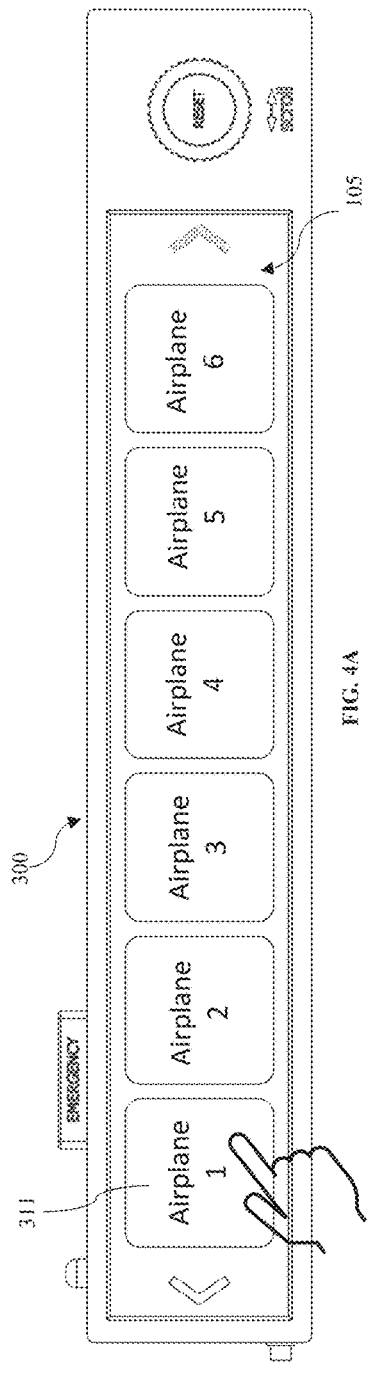
FIGS. 4A-4C are a graphical representation of an operation of a system for providing a plurality of checklists to a pilot, according to an example embodiment.
Figure 4B:
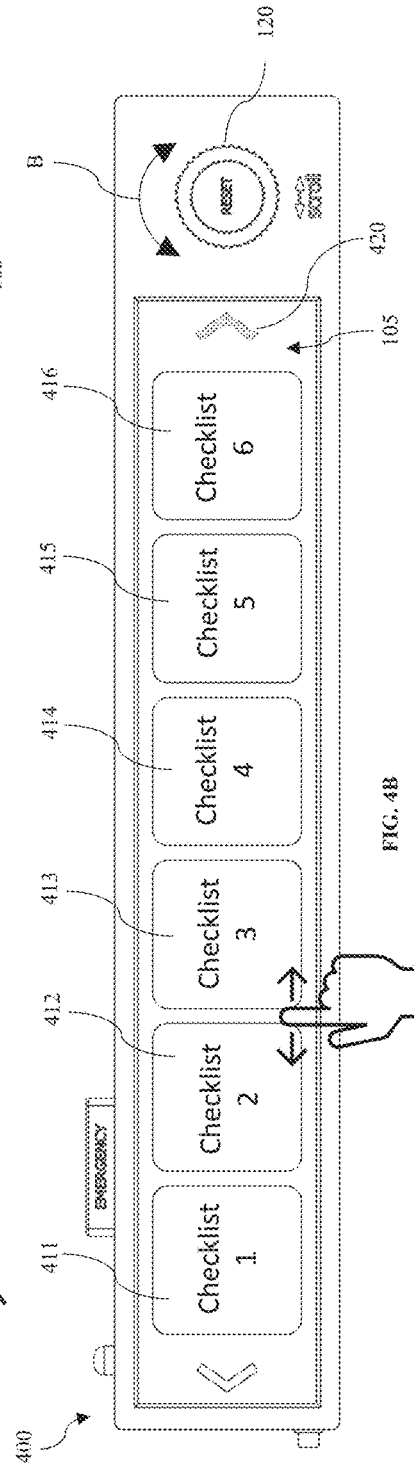
Figure 4C:
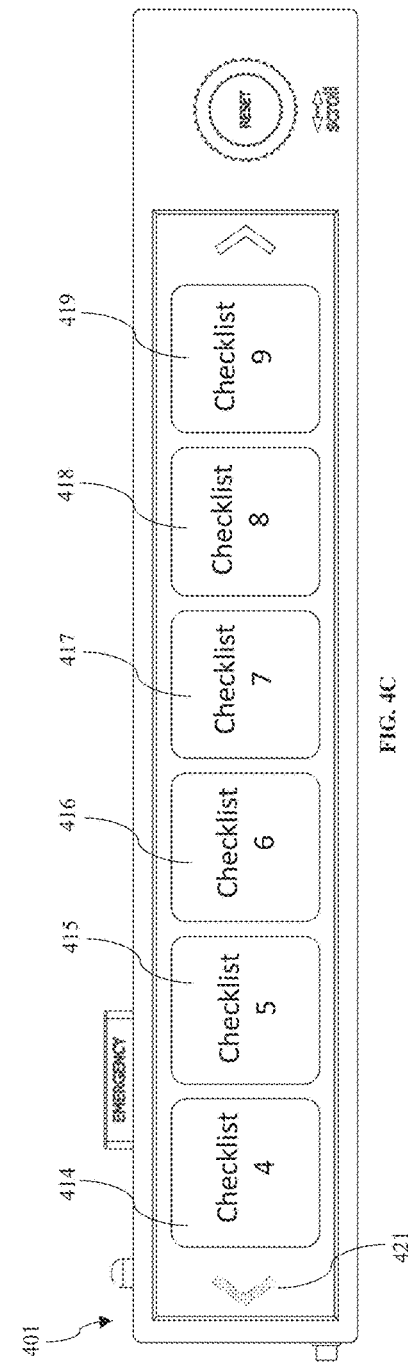

FIGS. 4A-4C illustrate an operation of a system for providing a plurality of checklists to a pilot. In FIG. 4A, the graphical display 105 is displaying a graphical representation 300 of a plurality of airplane profiles, wherein, a first airplane profile 311 of the plurality of airplane profiles is selected. When the user pilot selects an airplane profile by touching a portion of the touchscreen display or by pressing an additional button on the housing, the graphical display switches to displaying a graphical representation 400 of a plurality of checklists, wherein, the plurality of checklists includes a first checklist 411, second checklist 412, third checklist 413, fourth checklist 414, fifth checklist 415, and sixth checklist 416. When the first dial 120 is rotated in a direction B, the graphical display 105 switches to displaying a graphical representation 401, wherein, the first checklist, second checklist 412, and third checklist 413 are now hidden from the screen, and a seventh checklist 417, eight checklist, 418, and ninth checklist 419 now appear. Indicators 420, 421 will light up to notify a pilot about the existence of hidden profiles. In example embodiments, the indicators 420, 421 are graphical representations of arrows, wherein, the arrow signifies which direction the first knob needs to be turned in order to reveal the hidden profiles. In FIG. 4B, indicator 420 is lit (denoted by shading), indicating that there are hidden checklists, in this case the hidden checklists are the seventh checklist 417, eight checklist, 418, and ninth checklist 419. Conversely, in FIG. 4C, indicator 421 is lit, indicating that there are hidden checklists, in this case the hidden checklists are the first checklist 411, second checklist 412, and third checklist 413. The user pilot may also use gesture inputs such as swiping a portion of the touchscreen of the graphical display 105 to scroll between profiles. This operation will be discussed in greater detail below.

FIGS. 5A-5C illustrate an operation of a system for providing a plurality of checklists to a pilot. In FIG. 5A, the graphical display 105 is displaying a graphical representation 400 of a plurality of checklists, wherein, a first checklist 411 of the plurality of checklists is selected. When the user pilot selects a checklist by touching a portion of the touchscreen display or by pressing an additional button on the housing, the graphical display switches to displaying a graphical representation 500 of a plurality of tasks, wherein, the plurality of tasks includes a first task 511, second task 512, third task 513, fourth task 514, fifth task 515, and sixth task 516. When the first dial 120 is rotated in a direction B, the graphical display 105 switches to displaying a graphical representation 501, wherein, the first task, second task 512, and third task 513 are now hidden from the screen, and a seventh task 517, eight task, 518, and ninth task 519 now appear. Indicators 520, 521 will light up to notify a pilot about the existence of hidden profiles. In example embodiments, the indicators 520, 521 are graphical representations of arrows, wherein, the arrow signifies which direction the first knob needs to be turned in order to reveal the hidden profiles. In FIG. 5B, indicator 520 is lit (denoted by shading), indicating that there are hidden tasks, in this case the hidden tasks are the seventh task 517, eight task, 518, and ninth task 519. Conversely, in FIG. 5C, indicator 521 is lit, indicating that there are hidden tasks, in this case the hidden tasks are the first task 511, second task 512, and third task 513. The user pilot may also use gesture inputs such as swiping a portion of the touchscreen of the graphical display 105 to scroll between profiles. This operation will be discussed in greater detail below.

Figure 6A:
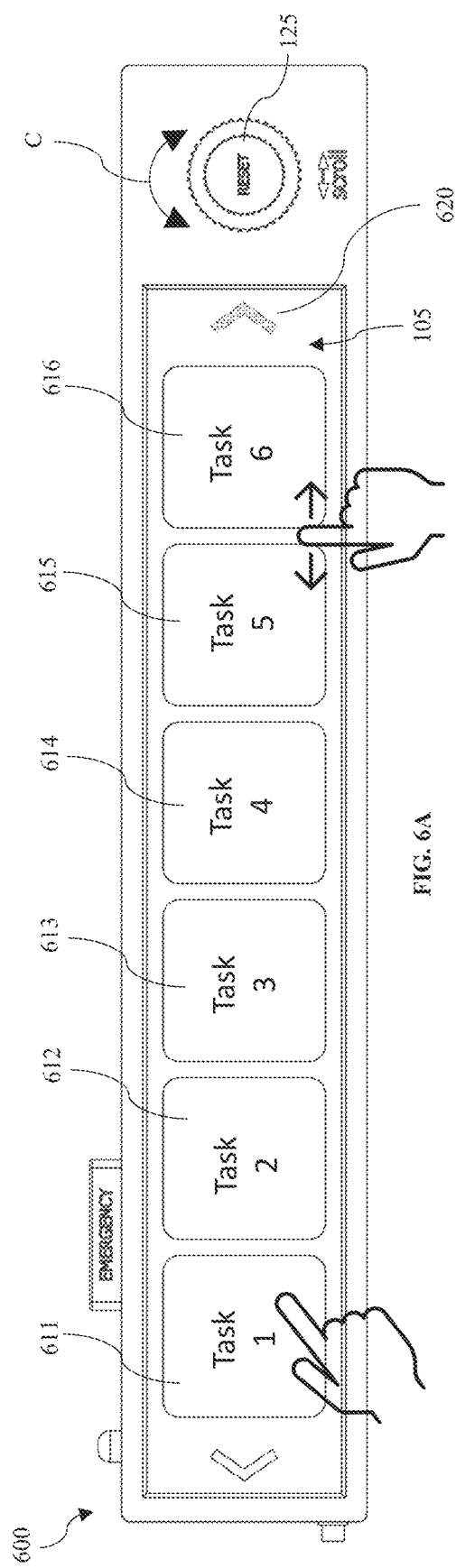
FIGS. 6A and 6B are a graphical representation of an operation of a system for providing a plurality of checklists to a pilot, according to an example embodiment.
Figure 6B:
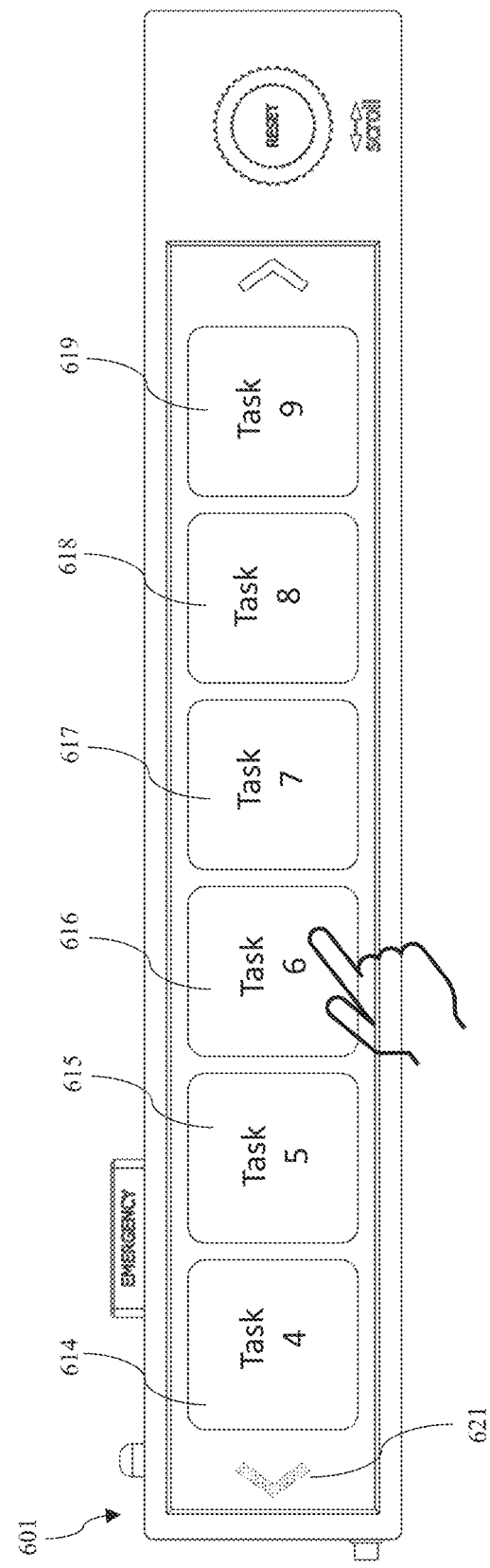

FIGS. 6A and 6B illustrate an operation of a system for providing a plurality of checklists to a pilot. The graphical display 105 is displaying a graphical representation 600 of a plurality of tasks associated with a checklist, wherein, the plurality of tasks includes a first task 611, second task 612, third task 613, fourth task 614, fifth task 615, and sixth task 616. The first task 611 is designated as the presently selected task 610. When the second dial 125 is rotated in a direction C, the graphical display switches displaying a graphical representation 601, wherein, the first task, second task 612, and third task 613 are now hidden from the screen, and a seventh task 617, eight task, 618, and ninth task 619 now appear. Indicators 620, 621 will light up to notify a pilot about the existence of hidden profiles. In example embodiments, the indicators 620, 621 are graphical representations of arrows, wherein, the arrow signifies which direction the first knob needs to be turned in order to reveal the hidden profiles. In FIG. 6A, indicator 620 is lit (denoted by shading), indicating that there are hidden tasks, in this case the hidden tasks are the seventh task 617, eight task, 618, and ninth task 619. Conversely, in FIG. 6B, indicator 621 is lit, indicating that there are hidden tasks, in this case the hidden tasks are the first task 611, second task 612, and third task 613. The user pilot may also use gesture inputs such as swiping a portion of the touchscreen of the graphical display 105 to scroll between profiles. This operation will be discussed in greater detail below.

Figure 7A:
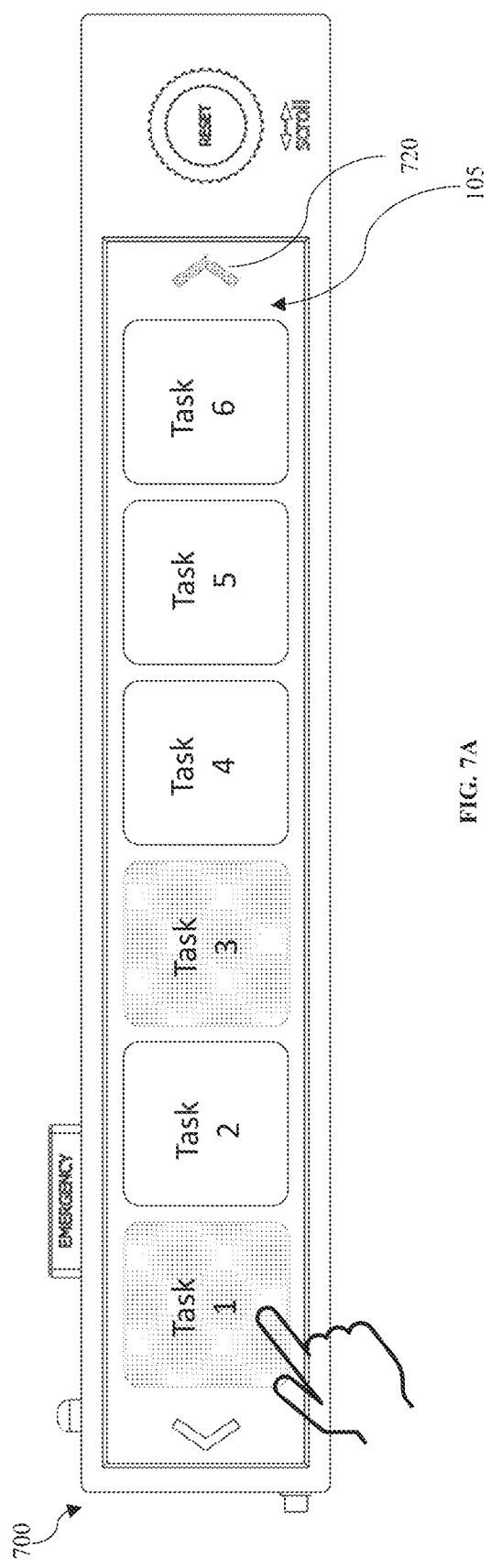
FIGS. 7A and 7B are a graphical representation of an operation of a system for providing a plurality of checklists to a pilot, according to an example embodiment.
Figure 7B:
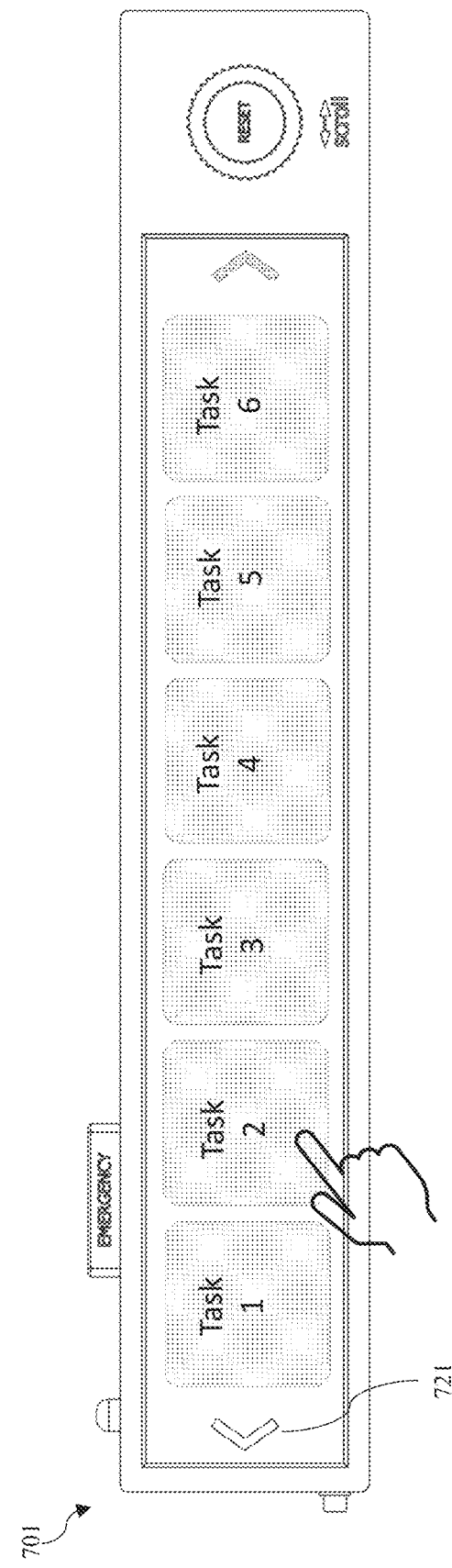

FIGS. 7A and 7B illustrate an operation of a system for providing a plurality of checklists to a pilot. The graphical display 105 is a touchscreen display and is displaying a graphical representation 700 of a plurality of completed and incomplete tasks, wherein, some of the tasks are in a completed state and some of the tasks are in an incomplete state. When the user pilot selects a task in an incomplete state by touching a portion of the touchscreen display or by pressing an additional button on the housing, the graphical display switches to a graphical representation of a task in a completed state. The user pilot repeats this process until all tasks of a plurality of tasks are in a completed state, wherein, the graphical display is displaying a graphical representation 701 of a plurality of completed tasks. Conversely, when the user pilot selects a task in a completed state by touching a portion of the touchscreen display or by pressing an additional button on the housing, the graphical display switches to a graphical representation of a task in an incomplete state. Indicator 720 is lit, indicating there are additional tasks not shown on the screen, which proceed task 6 as displayed on the graphical display. Indicator 721 is not lit, indicating there are no additional task which precede task 1 as displayed on the graphical display. This operation will be discussed in greater detail below.

FIGS. 8A and 8B illustrate an operation of a system for providing a plurality of checklists to a pilot. The graphical display 105 is displaying a graphical representation 800 of a plurality of tasks associated with a checklist, wherein, each of the plurality of tasks is in a completed state. When the user pilot presses the reset push button 135 in a direction A (as shown in FIG. 2) the graphical display switches to displaying a graphical representation 801, wherein, the plurality of tasks associated with a checklist, wherein, each of the plurality of tasks is in an incomplete state. This operation will be discussed in greater detail below.

FIGS. 9A and 9B illustrate an operation of a system for providing a plurality of checklists to a pilot. When a user pilot depresses the emergency push button 130 in a direction D, the graphical display 105 switches to displaying a graphical representation 900 of a plurality of emergency checklists, further wherein, the plurality of emergency checklists includes a first emergency checklist 911, second emergency checklist 912, third emergency checklist 913, fourth emergency checklist 914, fifth emergency checklist 915, and sixth emergency checklist 916. When the first dial 120 is rotated in a direction B, the graphical display switches to displaying a graphical representation 901, wherein, the first emergency checklist, second emergency checklist 912, and third emergency checklist 913 are now hidden from the screen, and a seventh emergency checklist 917, eight emergency checklist, 918, and ninth emergency checklist 919 now appear. Indicators 920, 921 will light up to notify a pilot about the existence of hidden profiles. In example embodiments, the indicators 920, 921 are graphical representations of arrows, wherein, the arrow signifies which direction the first knob needs to be turned towards in order to reveal the hidden profiles. In FIG. 9A, indicator 920 is lit (denoted by shading), indicating that there are hidden emergency checklists, in this case the hidden emergency checklists are the seventh emergency checklist 917, eight emergency checklist, 918, and ninth emergency checklist 919. Conversely, in FIG. 9B, indicator 921 is lit, indicating that there are hidden emergency checklists, in this case the hidden emergency checklists are the first emergency checklist 911, second emergency checklist 912, and third emergency checklist 913. The user pilot may also use gesture inputs such as swiping a portion of the touchscreen of the graphical display 105 to scroll between profiles. This operation will be discussed in greater detail below.

FIGS. 9C-9E illustrate an operation of a system for providing a plurality of checklists to a pilot. In FIG. 9C, the graphical display 105 is displaying a graphical representation 903 of a plurality of emergency checklists. When the user pilot selects an emergency checklist by touching a portion of the touchscreen display or by pressing an additional button on the housing, the graphical display switches to displaying a graphical representation 905 of a plurality of tasks, wherein, the plurality of tasks includes a first task 931, second task 932, third task 933, fourth task 934, fifth task 935, and sixth task 936. When the first dial 120 is rotated in a direction B, the graphical display 105 switches to displaying a graphical representation 905, wherein, the first task, second task 932, and third task 933 are now hidden from the screen, and a seventh task 937, eight task, 938, and ninth task 939 now appear. Indicators 940, 941 will light up to notify a pilot about the existence of hidden profiles. In example embodiments, the indicators 940, 941 are graphical representations of arrows, wherein, the arrow signifies which direction the first knob needs to be turned in order to reveal the hidden profiles. In FIG. 9D, indicator 940 is lit (denoted by shading), indicating that there are hidden tasks, in this case the hidden tasks are the seventh task 937, eight task, 938, and ninth task 939. Conversely, in FIG. 9E, indicator 941 is lit, indicating that there are hidden tasks, in this case the hidden tasks are the first task 931, second task 932, and third task 933. The user pilot may also use gesture inputs such as swiping a portion of the touchscreen of the graphical display 105 to scroll between profiles. This operation will be discussed in greater detail below.

Figure 10A:
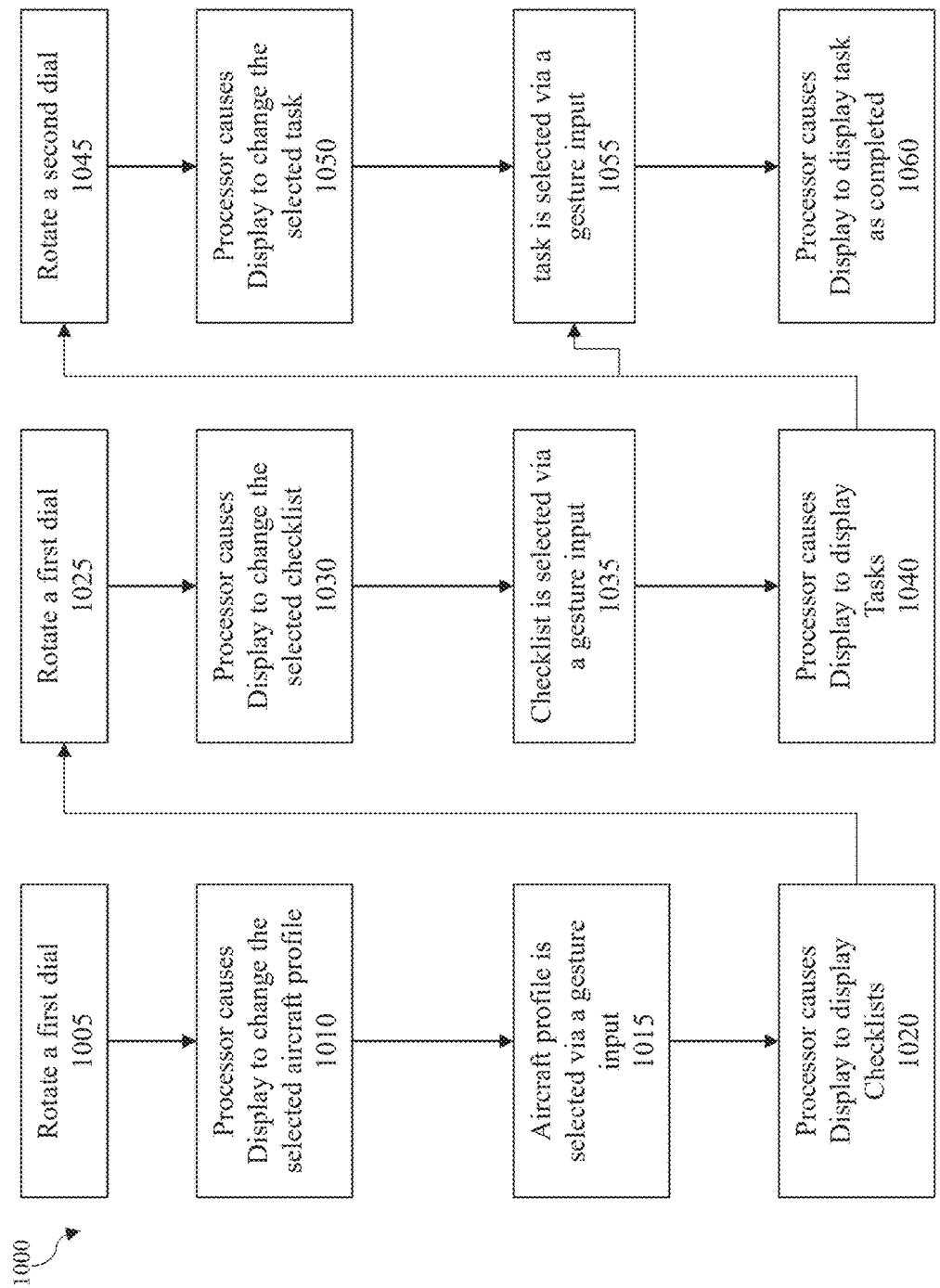
FIG. 10A-10C are step diagrams illustrating the steps for the operation of a system for providing a plurality of checklists to a pilot, according to an example embodiment.
Figure 10B:
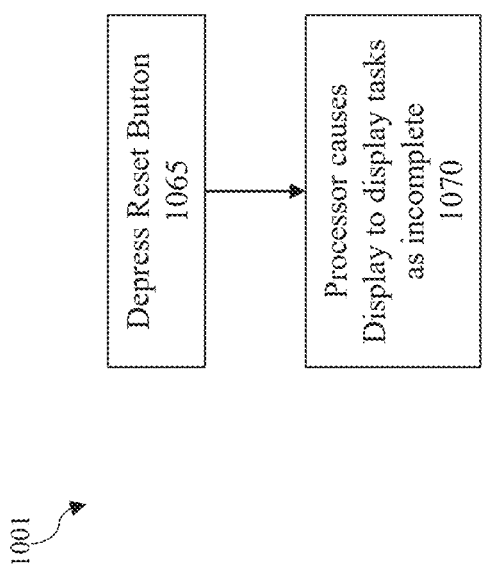
Figure 10C:
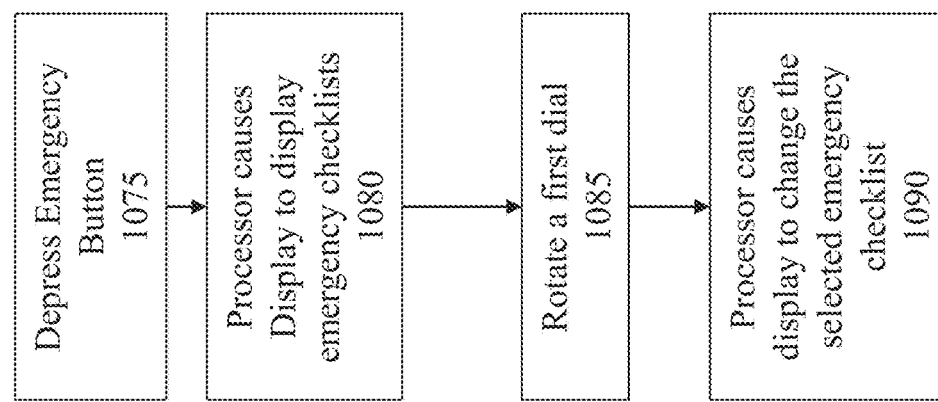

FIGS. 10A-10C are block diagrams illustrating the steps for the operation of a system for providing a plurality of checklists to a pilot. FIG. 10A illustrates the steps 1000 for navigating through the plurality of airplane profiles, checklists and tasks. The user pilot rotates a first dial in step 1005. When the first dial is rotated the processor causes the graphical display to change the selected airplane profile 1010. Upon changing the selected airplane profile, an airplane profile is selected via a gesture input 1015. Once an airplane profile is selected, the processor causes the graphical display to display a plurality of checklists 1020. The user pilot again rotates a first dial 1025. When the first dial is rotated the processor causes the graphical display to change the selected checklist 1030. Upon changing the selected checklist, a checklist is selected via a gesture input 1035. Once a checklist is selected, the processor causes the graphical display to display a plurality of tasks 1040. The user pilot then rotates a second dial in step 1045. When the second dial is rotated the processor causes the graphical display to change the selected task in step 1050. Upon changing the selected task, a task is selected via a gesture input 1055. Once a task is selected, the processor causes the graphical display to display the task as completed 1060. In some embodiments, steps 1045 and 1050 may be skipped, e.g., a task can be selected via a gesture input immediately after the processor causes the graphical display to display a plurality of tasks. FIG. 10B illustrates the steps 1001 for operating the reset button and resetting a task from being displayed as complete to being displayed as incomplete. The user pilot depresses the reset button 1065, upon depressing the reset button the processor causes the graphical display to display all tasks as incomplete 1070. In some embodiments, only a selected completed task is displayed as incomplete upon depressing the reset button. In further embodiments, depressing the reset button may reset only a selected completed task or all of the completed tasks in a checklist, depending on the duration of the press, e.g., if the reset button is depressed and released immediately, only the selected task will be reset and if the reset button is depressed and held in a depressed position for a predetermined amount of time, all tasks in a checklist will be reset. FIG. 10C illustrates the steps 1002 for operating the emergency button. The user pilot depresses the emergency button 1075, upon depressing the emergency button the processor causes the graphical display to display a plurality of emergency checklists 1080. The user pilot rotates a first dial 1085. When the first dial is rotated the processor causes the graphical display to change the selected emergency checklist 1090.

Figure 11:
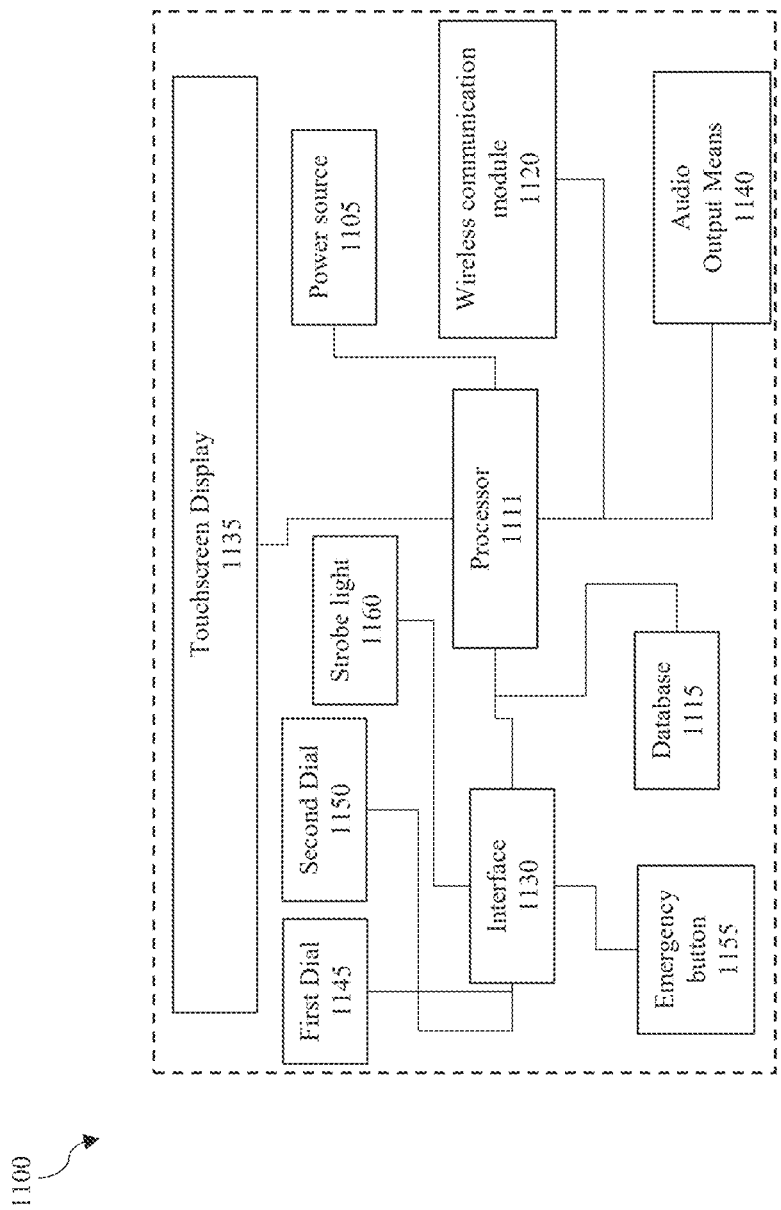
FIG. 11 is a block diagram illustrating the electrical components of a system for providing a plurality of checklists to a pilot, according to an example embodiment.

Referring now to FIG. 11, a diagram 1100 illustrating the main electrical components of a system for providing a plurality of checklists to a pilot, according to an example embodiment. A power source 1105 is in electrical communication with a touchscreen display 1135 and processor 1110. The processor is also in electrical communication with each of a database 1115, wireless communication module 1120, interface 1130, and audio output means 1140. The interface 1130 is in further electrical communication with each of a first dial 1145, second dial 1150, emergency button 1155, and strobe light 1160 (sometimes referred to as a strobe light emitting apparatus).

Figure 12:
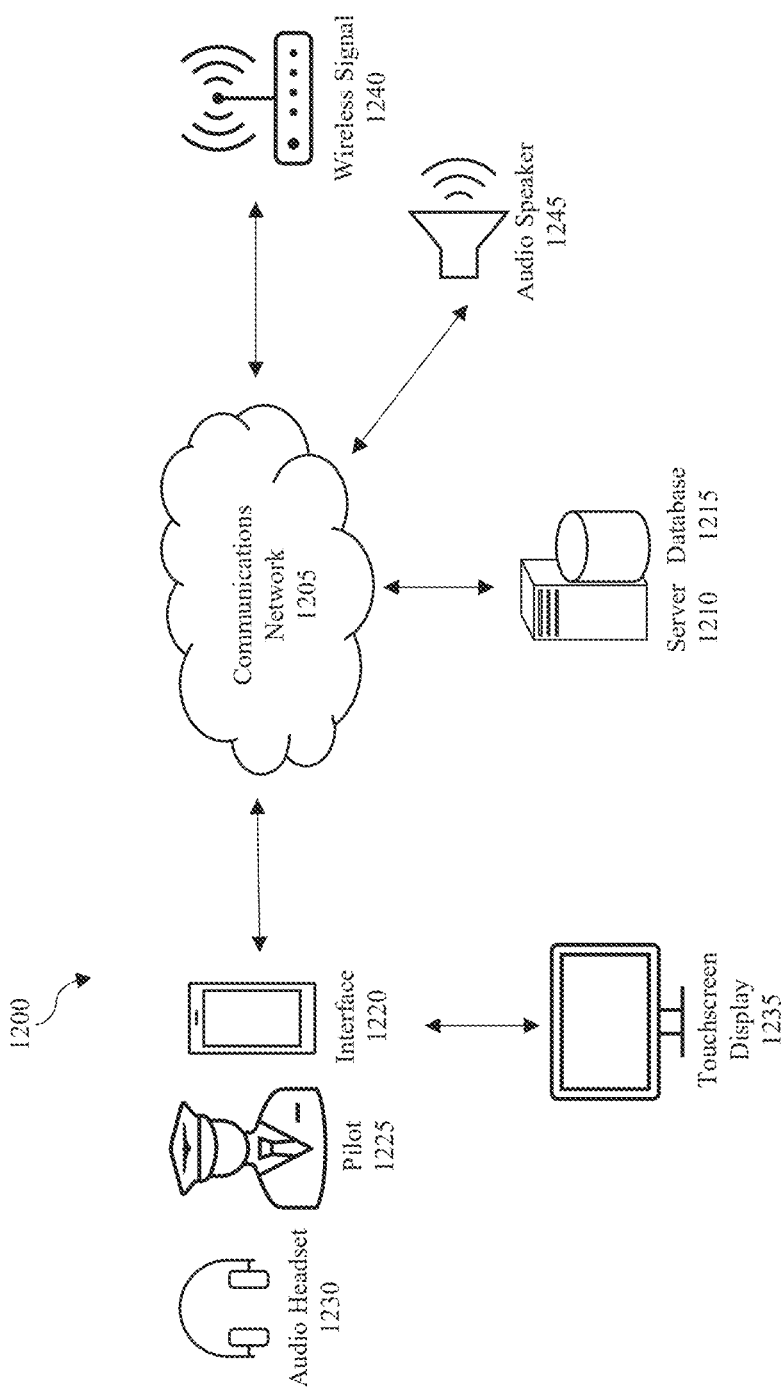
FIG. 12 is a block diagram illustrating a system for providing a plurality of checklists to a pilot, according to an example embodiment.

Referring now to FIG. 12. is a diagram of an operating environment 1200 that supports a system for providing a plurality of checklists to a pilot, according to an example embodiment. The most prominent element of FIG. 12 is the server 1210 associated with database 1215 and further coupled with the communications network 1205, which can be a circuit switched network, such as the Public Service Telephone Network (PSTN), or a packet switched network, such as the Internet or the World Wide Web, the global telephone network, a cellular network, a mobile communications network, or a Personal Area Network (PAN), such as Bluetooth® or any combination of the above. In one embodiment, communications network 1205 is a secure network wherein communications between endpoints are encrypted so as to ensure the security of the data being transmitted. Server 1210 is a central controller or operator for the functionality that executes on at least an interface 1220, a wireless signal 1240, and an audio speaker 1245, via various methods.

The interface 1220 corresponds to a pilot 1225 and an audio headset 1230. The interface 1220 also is an operator for the functionality that executes on a touchscreen display 1235. The interface 1220, wireless signal 1240, and audio speaker 1245 may include transceivers for communicating over the communications network 1205.

FIG. 12 further shows that server 1210 includes a database 1215, which may be one or more of a relational database comprising a Structured Query Language (SQL) database stored in a SQL server, a columnar database, a document database and a graph database. The database 1215 serves data from a database, which is a repository for data used by server 702 and the remote computing device during the course of operation of the invention. The database 1215 may be distributed over one or more nodes or locations that are connected via communications network 1205.

FIG. 12 shows an embodiment wherein interface 1220, wireless signal 1240, and audio speaker 1245 may interact with server 1210 and database 1215 over the communications network 1205. Server 1210 includes a software engine that delivers applications, data, program code and other information to interface 1220, wireless signal 1240, and audio speaker 1245. The software engine of server 1210 may perform other processes such as audio and/or video streaming or other standards for transferring multimedia data in a stream of packets that are interpreted and rendered by a software application as the packets arrive.

Server 1210 also includes program logic comprising computer source code, scripting language code or interpreted language code that is compiled to produce executable file or computer instructions that perform various functions of the present invention. In another embodiment, the program logic may be distributed among one or more of a server 1210, interface 1220, wireless signal 1240, and audio speaker 1245, or any combination of the above.

Note that although server 1210 is shown as a single and independent entity, in one embodiment of the present invention, the functions of server 1210 may be integrated with another entity, such as each of interface 1220, wireless signal 1240, and audio speaker 1245. Further, server 1210 and its functionality, according to a preferred embodiment of the present invention, can be realized in a centralized fashion in one computer system or in a distributed fashion wherein different elements are spread across several interconnected computer systems.

Figure 13:
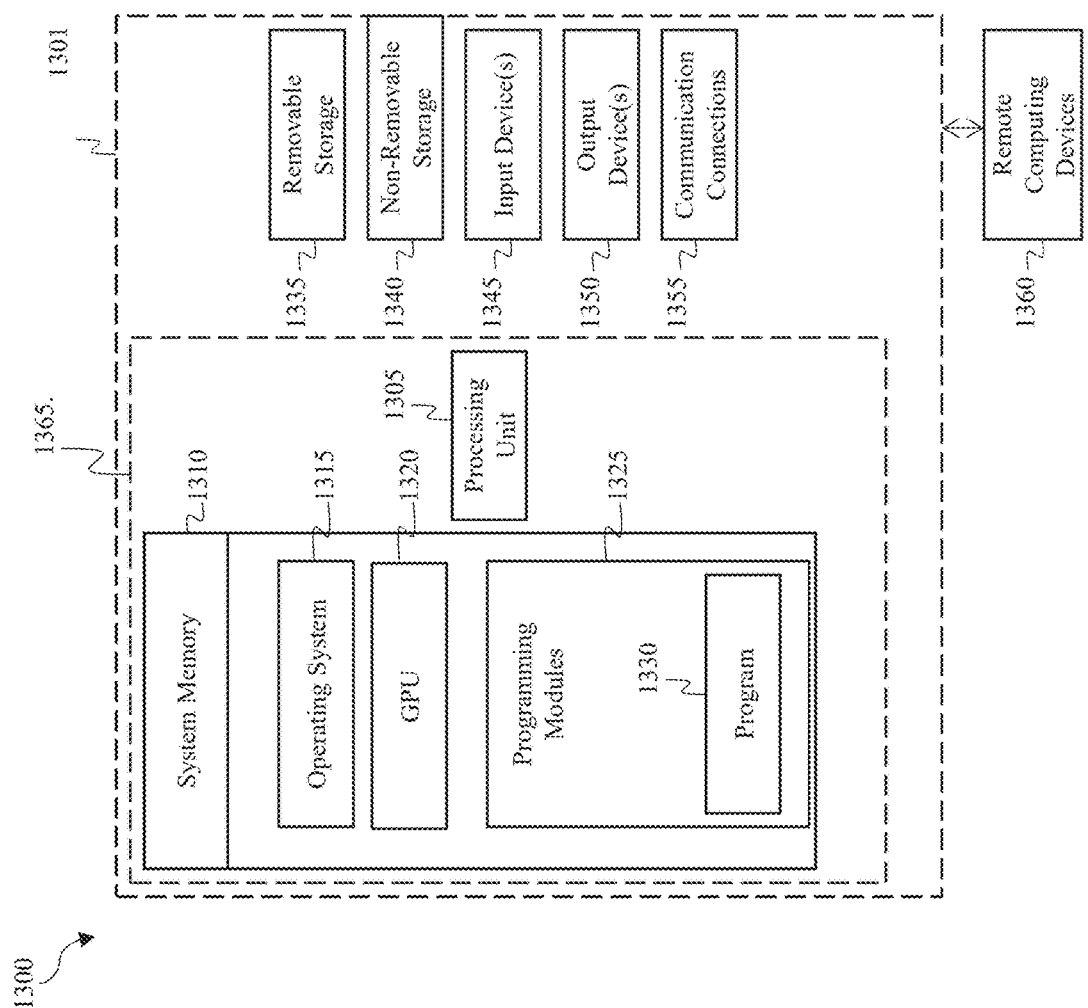
FIG. 13 is a block diagram of a system for providing a plurality of checklists to a pilot, including a computing device and other computing devices, according to an example embodiment.

Referring now to FIG. 13, a block diagram 1300 of a computing device 1301 for a system for providing a plurality of checklists to a pilot, according to an example embodiment. In a basic configuration, computing device 1301 may include at least one processing unit 1305 and a system memory 1310. In addition, computing device 1301 may include at least one graphics processing unit (GPU) 1320 to render images and videos quickly and efficiently. It accelerates graphics processing, offloads tasks from the at least one processing unit 1305, and enables real-time interactivity and high-quality visuals in applications. Depending on the configuration and type of computing device, system memory 1310 may comprise, but is not limited to, volatile (e.g., random access memory (RAM)), non-volatile (e.g., read-only memory (ROM)), flash memory, or any combination or memory. System memory 1310 may include operating system 1315, and one or more programming modules 1325. In one embodiment, the one or more programming modules 1325 may include, for example, a program 1330 for executing software instructions of the system. Furthermore, embodiments of the invention may be practiced in conjunction with a graphics library, other operating systems, or any other application program and is not limited to any particular application or system. This basic configuration is illustrated in FIG. 13 by those components within a dashed line 1365.

Computing device 1301 may have additional features or functionality. For example, computing device 1301 may also include additional data storage devices (removable and/or non-removable) such as, for example, magnetic disks, optical disks, or tape. Such additional storage is illustrated in FIG. 13 by a removable storage 1335 and a non-removable storage 1340. Computer storage media may include volatile and nonvolatile, removable and non-removable media implemented in any method or technology for storage of information, such as computer readable instructions, data structures, program modules, or other data. System memory 1310, removable storage 1335, and non-removable storage 1340 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1301. Any such computer storage media may be part of computing device 1301. Computing device 1301 may also have input device(s) 1345 such as a keyboard, a mouse, a pen, a sound input device, a camera, a touch input device, etc. Output device(s) 1350 such as a display, speakers, a printer, etc. may also be included. The aforementioned devices are only examples, and other devices may be added or substituted.

Computing device 1301 may also contain a communication connection 1355 that may allow computing device 1301 to communicate with other computing devices, such as, a remote computing device 1360. Communication connection 1355 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, Bluetooth® and other wireless media. The term computer readable media as used herein may include both computer storage media and communication media.

As stated above, a number of program modules and data files may be stored in system memory 1310, including operating system 1315. While executing on the at least one processing unit 1305, one or more programming modules 1325 (e.g., program 1330) may perform processes including software instructions. The aforementioned processes are examples, and the at least one processing unit 1305 may perform other processes, including the ones described below. Other programming modules that may be used in accordance with embodiments of the present invention may include electronic mail and contacts applications, word processing applications, spreadsheet applications, database applications, slide presentation applications, drawing or computer-aided application programs, etc.

Referring now to the FIGS. 1-13, a system for providing a plurality of checklists to a pilot, the system comprising a housing 100 enclosing a plurality of system components, a power source 1105, a processor 1110 in electrical communication with the power source, a database 1115, in connection with the processor, the database configured for storing the plurality of checklists, a plurality of airplane profiles, and a plurality of event logs, a wireless communication module 1120 configured to enable data transfer between the processor and a remote computing device 1260, an interface 1130, in connection with the processor, wherein the interface is configured to receive input from a user related to the plurality of checklists and the plurality of airplane profiles, a graphical display 105 for displaying a first checklist of the plurality of checklists and an audio output means 110 in connection with the processor configured to provide audio feedback. The processor is configured for executing a plurality of software instructions for managing and displaying the plurality of checklists related to each of the plurality of airplane profiles.

The housing 100 is designed to protect and organize the internal components of the system. The housing of the system is a robust enclosure that physically protects and organizes the internal components, ensuring the device's durability and reliability in demanding aviation environments. Constructed from high-strength materials like aluminum alloy, reinforced plastic, or impact-resistant composites, the housing is designed to withstand harsh conditions, including vibrations, shocks, and extreme temperatures. It is often weatherproof and resistant to moisture, dust, and other contaminants, making it suitable for use in various cockpit settings and during different flight conditions. The housing is designed with an ergonomic form factor, allowing for easy handling, mounting, or integration within the cockpit. It features intuitive placement of controls, including dials, buttons, and the graphical display, ensuring that pilots can operate the system comfortably, even in high-stress scenarios or turbulent conditions. The layout prioritizes easy access, with components such as the emergency button, dials, and reset button strategically positioned for quick and efficient use, minimizing distraction from primary flight operations. The housing also includes dedicated ports or connectors for components like the wireless communication module, power source, and potential integration with external systems. It may have additional features like ventilation channels or heat-dissipation mechanisms to prevent overheating, ensuring the system maintains optimal performance during extended use. The mounting options of the housing are versatile, allowing it to be securely attached to a variety of cockpit surfaces, either with brackets, clamps, or quick-release mechanisms, ensuring stability and adaptability across different aircraft models.

The power source 1105 supplies electrical energy to the system's components. It provides electrical energy to the processor, graphical display, audio output means, wireless communication module, and other connected parts. The power source can be a rechargeable lithium-ion or lithium-polymer battery, known for its high energy density, long operational life, and ability to maintain charge over extended periods, making it well-suited for aviation environments. In some configurations, the power source may also integrate with the aircraft's electrical system, enabling direct power supply or recharging while in flight, ensuring uninterrupted functionality. In some embodiments, the power source is designed with backup capabilities, including a secondary battery or capacitor that automatically activates in case of primary power failure, maintaining critical system operations during emergencies. It features voltage regulation circuitry, providing stable and consistent power delivery to sensitive components, preventing issues like sudden shutdowns or malfunctions due to power fluctuations. The power source may also include power management software, integrated with the processor, to monitor battery levels, optimize energy usage, and provide alerts when the power is running low, ensuring the pilot is informed of the system's power status. It supports quick charging capabilities, minimizing downtime and ensuring rapid recharging between flights or operational cycles. Built to withstand the rigors of aviation environments, the power source is designed to be resistant to vibration, extreme temperatures, and pressure changes, ensuring dependable performance throughout various flight conditions. The overall design emphasizes safety, featuring protections against overcharging, overheating, and short circuits, thus ensuring the system remains safe and functional during all phases of operation.

The processor 1110 is the central control unit of the system, managing the execution of various software instructions. The processor is in electrical communication with the power source. It can be a microcontroller or a central processing unit (CPU) designed for embedded systems, featuring multiple cores to enhance processing speed and efficiency. The processor is responsible for managing input/output operations, coordinating data flow between components, processing user inputs, and executing checklist management software. It may also include a co-processor or hardware accelerators to handle specific tasks, such as graphical display rendering or audio signal processing, thereby improving system responsiveness. The processor is configured for executing a plurality of software instructions for managing and displaying the plurality of checklists related to each of the plurality of airplane profiles. The software instructions include algorithms for checklist management, display rendering, user input processing, and event logging. The processor executes these instructions to dynamically load the appropriate checklist based on the selected airplane profile, update checklist status in real-time, provide visual and audio prompts, and log user interactions for record-keeping and performance evaluation. The software is designed with a modular architecture, enabling easy updates, customization, and integration of additional features as needed.

The database 1115 in the system is a centralized storage unit designed to hold, manage, and organize critical data related to checklists, airplane profiles, and event logs. It is connected to the processor and serves as the primary repository for the plurality of checklists, which include pre-flight, in-flight, emergency, and post-flight procedures, as well as any custom checklists tailored to specific airplane profiles. Additionally, the database stores airplane profiles, each containing information such as configuration settings, performance data, and checklist associations unique to different aircraft types. It also maintains a detailed log of events, recording user interactions, task completions, system errors, and other significant actions to support operational tracking and post-flight analysis. Built using non-volatile memory such as flash storage or solid-state drives (SSDs), the database ensures data retention even when the system is powered off, providing reliability and consistency in data access. To facilitate efficient data retrieval, the database uses advanced indexing and search algorithms, enabling quick access to specific checklists or profile information. It supports frequent read/write operations and incorporates data encryption and security measures to protect sensitive information. The database may also enable data synchronization with remote computing devices through the wireless communication module, allowing for updates, backups, or integration with other systems in real-time. Its architecture is modular, permitting easy upgrades, additions of new checklists or profiles, and adaptability to evolving software needs.

The wireless communication module 1120 facilitates data transfer between the processor and a remote computing device. It can use standard wireless communication protocols such as Wi-Fi, Bluetooth, or cellular networks to enable remote connectivity. The wireless communication module allows for the upload and download of checklists, airplane profiles, software updates, and event logs, ensuring that the system remains current and synchronized with external devices, such as flight management systems, ground crew terminals, or maintenance databases. It also supports real-time data exchange, enabling features like remote monitoring, collaborative checklist management, and sending alerts or notifications directly to the remote device. To maintain secure and reliable communication, the wireless communication module uses data encryption, authentication protocols, and error correction methods, safeguarding data integrity and confidentiality during transmission. Additionally, it is designed to handle variable signal strengths and interference commonly encountered in aircraft environments, employing techniques like adaptive transmission rates, signal boosting, or automatic reconnection to enhance communication stability. The wireless communication module is configured to be low power, aligning with the system's energy efficiency requirements and extending operational time, especially during critical phases of flight. It integrates seamlessly with the system's software, enabling pilots to initiate or manage wireless connections through the user interface, ensuring intuitive operation while maintaining focus on flight task.

The interface 1130 comprises a set of input devices that allow users to interact with the system. The interface is configured to receive input from the pilot, enabling the selection and modification of checklists, airplane profiles, or system settings. The interface is composed of various input elements, including buttons, dials, and a touchscreen display, all of which are in direct communication with the processor. The touchscreen display offers intuitive gesture-based controls, enabling pilots to tap, swipe, or pinch to interact with tasks, switch between checklists, or enter specific commands. The interface also includes physical input devices, such as the first dial for switching profiles or checklists and the second dial for navigating and managing tasks, providing tactile feedback that enhances usability during turbulent or low-visibility conditions. Additionally, the interface incorporates critical buttons like "enter," "back," and reset, allowing the pilot to confirm selections, return to previous screens, or correct task statuses as needed. It may also feature voice recognition, enabling hands-free control by responding to verbal commands, which is particularly useful in high-stress or emergency scenarios. Designed for ergonomics and responsiveness, the interface components are strategically positioned on the housing, ensuring easy access while minimizing distraction. The interface supports customization, allowing pilots to personalize the display layout, menu options, or shortcut configurations, making it adaptable to individual preferences or specific operational requirements.

The graphical display 105 serves as the primary visual output for the system. The display is typically a high-resolution LCD, OLED, or e-ink screen, optimized for readability under various lighting conditions, including bright sunlight or dim cockpit environments. It is configured to present information in a user-friendly layout, displaying checklists in a structured, sequential format, with tasks visually separated to enhance clarity and organization. The display supports gesture-based input, functioning as a touchscreen that allows pilots to use gestures such as tapping, swiping, or pinching to navigate through checklists, mark tasks as being in a completed state, or access additional details. The graphical display can show icons, text, color-coded indicators, and other visual elements that help the pilot monitor task statuses, such as an incomplete state or completed state. It is designed to be responsive, updating instantly as tasks are completed, modified, or reset. The display may also feature an adjustable brightness control, enabling pilots to adapt the screen's visibility according to ambient light conditions. During emergency situations, the display is programmed to prioritize the visualization of emergency checklists, instantly switching to critical procedures upon activation of the emergency button. Positioned on the housing for optimal line-of-sight viewing, the graphical display is easy to read at a glance, reducing the need for pilots to shift focus away from primary flight operations. Its horizontal orientation allows for a wide, panoramic view, accommodating longer checklists or side-by-side task comparisons. The display also integrates with the system's auditory feedback, providing synchronized visual and audio alerts to enhance situational awareness. It is durable and impact-resistant, designed to withstand vibrations, shocks, and other physical stresses common in aircraft environments, ensuring reliable performance throughout the flight.

In one embodiment, the graphical display is implemented as a touchscreen display that is disposed on the housing in a horizontal manner, enhancing both visibility and user interaction. The horizontally aligned touchscreen is positioned on the top surface of the housing, allowing the pilot to view and interact with it at a comfortable, ergonomically friendly angle. This layout makes it intuitive for pilots to quickly glance at the screen while maintaining situational awareness of the cockpit environment. The touchscreen display technology used in this embodiment could be capacitive or resistive, supporting a range of gesture-based inputs such as tapping, swiping, pinching, and multi-touch gestures. This enables pilots to perform various functions directly on the display, including scrolling through checklists, selecting specific tasks, confirming task completion, and modifying task details. The horizontal manner placement allows for a wider field of view, making it easier to display more information at once, such as multiple tasks from a checklist, side-by-side comparisons, or more detailed instructions for specific procedures. The touchscreen display is designed to be highly responsive, ensuring that user inputs are registered accurately and without delay, even in fast-paced scenarios. The surface of the touchscreen display is made from anti-glare, scratch-resistant glass to maintain visibility in different lighting conditions, whether under direct sunlight, dim cockpit lighting, or sudden glare from external sources. Additionally, the screen's brightness is adjustable, allowing the pilot to increase or decrease the illumination for optimal viewing in varying light conditions. The horizontal manner allows the touchscreen display to minimize potential reflections from cockpit lighting and windows, reducing visual distractions and ensuring clear visibility of checklist items. It is also designed to be resistant to vibrations, ensuring stable performance even during turbulent conditions. The placement makes it easy for pilots to interact with the system using one hand, enabling efficient operation while keeping the other hand available for flight controls. This horizontal touchscreen display embodiment not only improves user interface experience but also enhances the overall efficiency and safety of checklist management, allowing the pilot to access and tasks in a completed state quickly while maintaining focus on critical flight operations.

The audio output means 110 in the system is designed to provide clear, real-time audio feedback to the pilot, enhancing communication and checklist management. It includes components like built-in speakers, headphone jacks, or Bluetooth audio modules, allowing the pilot to hear alerts and instructions in various cockpit conditions. The audio output means serves multiple purposes, such as delivering voice prompts, task confirmations, warning sounds, or alerts that correspond with checklist events. It provides audio feedback for important changes, such as transitioning between flight phases, switching airplane profiles, or receiving emergency instructions, ensuring the pilot remains aware of critical updates even without direct visual engagement with the display. The audio output means is configured to offer adjustable volume levels, enabling the pilot to customize sound output based on personal preferences or cockpit noise levels. Additionally, it can deliver different types of sound cues—such as distinct tones, beeps, or synthesized speech—for varied notifications, ensuring easy recognition of the specific message being conveyed. The audio output means supports binaural output, providing directional audio to emphasize certain alerts or commands more effectively. In emergency situations, the audio output means is programmed to prioritize urgent alerts, such as high-priority warnings or checklist failures, and can deliver more intense or continuous sounds to capture attention. It is also integrated with the system's other components, such as the wireless communication module, allowing it to relay sounds to connected devices, like headsets or remote audio systems, ensuring seamless communication across devices. Built for reliability and clarity, the audio output is designed to be resistant to interference, ensuring that sounds are clear and intelligible even in the presence of engine noise or radio chatter. The system may also include auditory error correction features, repeating prompts or sounds if certain checklist tasks are in an incomplete state within a set time, helping the pilot maintain focus and adherence to the checklist.

The remote computing device 1260 in the system refers to an external device that can wirelessly connect to the system via the wireless communication module to facilitate data transfer, monitoring, and remote management of checklists. This device can be a tablet, laptop, smartphone, or a ground-based terminal, used by pilots, co-pilots, ground crew, or maintenance staff. It enables users to upload or download checklists, update airplane profiles, synchronize event logs, or receive real-time alerts and notifications, ensuring that the system remains current and fully integrated with broader operational systems. The remote device supports functions such as editing checklist entries, adding new tasks, conducting system diagnostics, or generating reports based on event logs. It can also be used to provide remote troubleshooting or software updates, enhancing the system's flexibility and reducing downtime. Communication with the remote computing device is secured through encryption protocols, ensuring data integrity and confidentiality. The remote computing device is crucial for enabling collaborative management of the system, allowing users to maintain effective checklist compliance and operational accuracy, even when physically away from the cockpit.

In embodiments, the housing 100 further comprises a first dial 120, second dial 125, emergency push button 130, reset push button 135, and a strobe light emitting apparatus 150. In the same or additional embodiments, the housing may further comprise a power switch 205 and at least one universal port 210.

The first dial 120 enables the pilot to switch between different airplane profiles stored in the system. When rotated, the processor detects this movement and updates the graphical display to show a different airplane profile. This allows the pilot to quickly select the relevant airplane profile, ensuring that the checklists and associated settings correspond to the chosen aircraft. The dial offers a smooth and continuous rotation mechanism, allowing precise control over profile selection. It may also feature detents (notches) to provide tactile feedback for each profile change, helping the pilot confirm the transition to a new profile without requiring visual confirmation.

In an example embodiment, as illustrated in FIGS. 3A and 3B and FIG. 10A, as shown in step 1005, when the first dial 120 is rotated in a direction B, the processor causes the graphical display 105 to display additional airplane profiles that were previously hidden. The processor then receives input, via the interface 101, of a selection of at least one of the first airplane profile 311 and the second airplane profile 312. This input may be from a user pilot touching a portion of the graphical display touchscreen or by pressing an additional button to select the desired airplane profile. After an airplane profile has been selected via the interface 101, the processor causes the graphical display 105 to switch between a graphical representation 300 of the plurality of airplane profiles to a graphical representation 400 of a plurality of checklists, as illustrated in FIGS. 4A and 4B, wherein the plurality of checklists is directly associated with the user selected airplane profile. After an airplane profile has been selected via the interface 101, the first dial 120 may be rotated in the direction B, wherein, the processor causes the graphical display 105 to display additional checklists that were previously hidden, as illustrated by FIGS. 4B and 4C. By rotating the first dial 120 in the B direction, the processor causes the graphical display to reveal additional tasks checklist, depending on the direction of rotation. This facilitates rapid access to various checklists, such as pre-flight, takeoff, in-flight, landing, and shutdown checklists. This feature is particularly useful in situations where the pilot needs to move quickly between checklists based on changing flight conditions or phases.

In embodiments, there is an emergency push button 130 disposed on a surface of the housing 100. The emergency button in the system is a dedicated, easily accessible control designed to facilitate rapid access to emergency checklists.

The emergency button allows the pilot to immediately enter emergency mode when pressed, triggering the system to prioritize the display of emergency checklists. To activate the emergency button, the user pilot presses the button in a direction D, as illustrated in FIGS. 9A and 9B. Upon activation, the processor detects the button press and the processor causes the graphical display to show a pre-defined set of emergency checklists relevant to critical situations, such as engine failure, fire, electrical system issues, or other urgent in-flight problems. The button is configured to override any ongoing checklist display, ensuring that emergency procedures are presented without delay, which can be crucial during time-sensitive incidents. The emergency button is designed to be prominent, highly visible, and easily distinguishable from other controls. It may be color-coded (e.g., red or orange) to signify its importance and enable quick identification, even under stress. It is typically larger than other buttons on the system and is positioned in an easily reachable location on the housing, ensuring it can be accessed rapidly, even with limited visibility or during turbulent conditions. The button has a tactile feedback mechanism, such as a click or resistance, confirming to the pilot that it has been properly engaged. This feedback is essential to ensure the button's function has been activated in high-pressure scenarios. The emergency button is designed to prevent accidental activation. This can be achieved by using a recessed design, a protective cover, or requiring a deliberate, firm press. The system may also include an auditory or visual alert (e.g., a beep or a flashing indicator on the display) when the emergency button is pressed, confirming that the system has shifted to emergency mode. To ensure that emergency checklists are fully displayed, the system may be configured to remain in emergency mode until the pilot intentionally exits it, preventing the system from accidentally reverting to standard checklists during a crisis. The emergency button interacts directly with the processor, enabling it to perform a system-wide prioritization of emergency procedures. This can include actions like increasing display brightness, adjusting audio output to a louder volume, or even initiating wireless communication with remote devices to alert ground crews or other pilots. It is also designed to work in conjunction with other safety features, such as audible alerts, strobe light emitting apparatus, or automatic logging of emergency actions, helping maintain comprehensive awareness during critical events. If the pilot presses the emergency push button 130, the functionality of the first dial 120 is temporarily adjusted to focus on emergency checklists. In this mode, rotating the first dial cycles through different emergency checklists, such as engine failure, electrical failure, or other critical situations. This capability ensures that the pilot can quickly and effectively access vital emergency procedures, maintaining focus on the checklist that corresponds to the specific emergency event.

The second dial 125 in the system is designed to provide pilots with precise control over individual task management within a checklist. It is a critical input component for navigating and interacting with the tasks displayed on the graphical interface. As shown in FIG. 1, the second dial 125 is disposed on the first dial 120. It has a smaller diameter than the first dial, making it noticeably visible and easily accessible to the user pilot, however, in some embodiments the second dial may be the same or of a greater diameter than the first dial. In further embodiments, the second dial is disposed directly onto the housing. In even further embodiment, the second dial is disposed directly onto the housing and the first dial is disposed on the second dial. As exemplified in the FIG. 1, the second dial 125 is also a reset push button 135. The primary function of the second dial is to allow the pilot to scroll through individual tasks within the currently displayed checklist. As exemplified in FIGS. 6A and 6B, the second dial can be rotated in a direction C. When the second dial is rotated the processor causes the graphical display to reveal tasks which were previously hidden, enabling the pilot to view each task in a checklist. This sequential navigation allows pilots to locate and focus on specific tasks, improving the efficiency of checklist execution. The second dial may feature detents (notches) that provide tactile feedback for each task transition, allowing the pilot to feel each shift clearly without needing to divert visual attention from the display. In addition to navigating between tasks, the second dial can be used to adjust task details when applicable. For example, if a task requires selecting a parameter (e.g., a flight altitude or speed setting), rotating the second dial can increase or decrease the value. This functionality ensures that pilots can easily modify task settings directly, allowing the dial to serve a dual purpose of navigation and input adjustment. the second dial's rotation mechanism is designed to provide high precision when navigating through tasks, even when there are a large number of tasks within a checklist. Its rotation can be smooth or stepped, depending on user preferences or specific design choices, ensuring that the pilot can control the speed of task navigation. The second dial is designed for easy operation in various conditions, including turbulence or during periods of intense focus. Its location on the housing is ergonomic, allowing pilots to use it quickly without looking away from essential flight operations. The dial's surface may include grooved or textured designs to enhance grip, making it easier for pilots to operate the dial accurately, even while wearing gloves or under stress. As the second dial is rotated or pressed, the processor causes the graphical display to respond in real-time, providing visual feedback to confirm task selection, completion, or modification. The system's software may also be configured to provide auditory cues via the audio output means when the second dial is used, helping ensure that the pilot is aware of task changes or adjustments without needing constant visual focus on the display.

The second dial works in coordination with the reset push button 135 to reset specific tasks. The reset button is typically designed to be smaller than emergency buttons, with a different color coding (e.g., yellow or blue) to distinguish it from other critical controls. The button has a tactile feedback mechanism, such as a click, confirming to the pilot that the reset action has been engaged successfully. The reset button can be depressed, as exemplified in FIG. 2, in a direction A. When a pilot selects a completed task using the second dial and then presses the reset button, the processor causes the graphical display to reflect the change, showing the associated task as "incomplete," indicated by a visual change, such as a color shift or symbol alteration. This integration provides precise control over task management, allowing pilots to correct mistakes or revisit tasks without affecting other checklist items. In some embodiments, pressing the reset button will reset all tasks to "incomplete" as exemplified in FIGS. 8A and 8B. In further embodiments, the reset button can be used to reset individual tasks or all tasks within a checklist, e.g., the user presses and releases the reset button to reset a selected task or presses and holds the reset button down for a predetermined amount of time to reset all tasks within a checklist. To prevent accidental resets, the system may require the pilot to press and hold the reset button for a short duration (e.g., 2-3 seconds) before a task is actually reset. This intentional delay helps ensure that the reset action is deliberate. Alternatively, the reset function can prompt a confirmation alert on the graphical display before executing the reset. This confirmation prompt provides an opportunity for the pilot to verify whether the reset is intended, preventing inadvertent changes to task statuses. The reset button interacts with the processor to ensure that only the selected task's status is changed, maintaining checklist integrity and accuracy. The reset functionality may also trigger auditory feedback through the audio output means, such as a specific sound indicating that a task has been reset, providing an additional layer of confirmation for the pilot. The reset button is particularly useful when a task was mistakenly marked as completed, or if the pilot needs to perform the task again due to a change in flight conditions or safety requirements. It can also be used during training sessions, where pilots may need to repeatedly complete and reset tasks for practice and familiarization with checklist operations.

The housing may include additional buttons to perform additional functions or functions already described. In an example embodiment, one of the additional buttons is an "enter" button. The "enter" button allows the pilot to confirm selections, mark tasks as completed, or enter sub-menus for more detailed task settings, ensuring seamless progression through the checklists. It is typically designed with a distinct tactile response to provide clear confirmation upon activation. In the same or further embodiments, one of the additional buttons is a "back" button. The "back" button, enables the pilot to return to the previous screen, menu, or task, facilitating easy correction of errors or adjustments to prior selections without disrupting workflow. Positioned strategically on the housing for quick access, both buttons are ergonomically designed to be easily distinguishable by touch, allowing for efficient operation even in low-visibility conditions or during high-stress situations. Together, these buttons offer intuitive navigation, enabling the pilot to manage checklist tasks effectively while maintaining focus on primary flight operations.

A strobe light emitting apparatus 150 may also be disposed on a side of the housing 100. The strobe light emitting apparatus in the system is a visual alert component designed to provide immediate, high-visibility notifications to the pilot, especially in critical situations where audio alerts may be insufficient or when a more conspicuous signal is needed. It is integrated into the system's housing and operates under specific conditions, such as when one or more tasks on a checklist remain incomplete after a predetermined trigger point, such as an elapsed amount time or an elapsed flight phase. The strobe light emitting apparatus emits intense, bright flashes in a pattern that is highly visible, even in brightly lit cockpit environments. The flashes are designed to draw the pilot's attention quickly, ensuring that essential tasks are addressed promptly. The light output is typically multi-directional, illuminating a broad area to maximize visibility and ensuring that it can be seen from various angles within the cockpit. The strobe light emitting apparatus is configured to emit flashes at varying intensities, colors, and intervals depending on the urgency of the alert. For example, a slow, steady flash might indicate a regular incomplete task, while a rapid, repetitive flash pattern could signal a more urgent or critical checklist item that requires immediate attention. The system may use colors like red or amber to differentiate the severity of the alert, with red indicating more critical tasks. To ensure durability, the strobe light emitting apparatus is built with shock-resistant materials, capable of withstanding cockpit vibrations, pressure changes, and other environmental stressors typically encountered during flight. It is also designed to be energy-efficient, drawing minimal power from the system to prevent unnecessary drain on the primary power source.

In one embodiment, the graphical display is a touchscreen display disposed on the housing in a horizontal manner. The processor is configured to cause the graphical display to visually present a plurality of tasks from a first checklist, wherein, a first task of the plurality of tasks is displayed visually separate from an adjacent task of the plurality of tasks. As illustrated in FIGS. 6A-8B, tasks are visually separate, meaning that each task is distinctly displayed with clear boundaries, making it easy for the pilot to identify and differentiate one task from the next. This separation helps ensure that each task can be individually selected, viewed, or interacted with without confusion. An adjacent task refers to a task that is positioned next to or near another task, either horizontally or vertically, depending on the display layout, in this case, the display on the housing is in a horizontal manner. Each task on the checklist can be in either an incomplete state or a completed state, represented by a different visual representation. The incomplete state is indicated by a first indicator such as a gray icon, an empty checkbox, a specific color (e.g., red), or other symbols that signify that the task has not yet been finished. In FIGS. 6A-8B, the incomplete state of a task is denoted by a white background. The completed state is represented by a second indicator, such as a green icon, a filled checkbox, a checkmark, or a change in color (e.g., green) to signal that the task has been finished. In FIGS. 6A-8B, the completed state of a task is denoted by a dot-patterned background. This dual-indicator system provides real-time feedback to the pilot, visually tracking progress and making it clear which tasks are still pending and which ones have been completed. Tasks in an incomplete state displayed on the graphical touchscreen display can be changed to a completed state when the touchscreen display receives a gesture input indicating that a task has been completed. Gesture input refers to specific touchscreen interactions performed by the pilot to interact with tasks. This can include a variety of predefined motions, such as tapping, swiping, pressing, or multi-touch gestures. When the display receives the appropriate gesture input corresponding to a specific task, the system changes the visual representation of that task from the incomplete state to the completed state, e.g., the first indicator is changed to the second indicator. This change is immediate, providing the pilot with clear, real-time feedback on task status. Conversely, a user pilot can change a task in the completed state to the incomplete state in the same manner. In an example embodiment, a predefined motion on the touchscreen display may be at least one of; a single touch on the screen to select or mark a task as complete (tapping), a horizontal or vertical swipe to navigate between tasks or checklists (swiping), a long press (i.e., "press and hold") to activate additional options or confirm a task's completion (pressing), or a two-finger pinches or spreads, if supported, for zooming in on task details or expanding sections of the checklist (multi-touch gestures).

In embodiments, the processor is further configured to cause the audio output means to emit a sound when one of the plurality of tasks of the first checklist is in the incomplete state after a predetermined trigger point. A predetermined trigger point refers to a specific condition or set of conditions programmed into the system that prompts an action, such as issuing an alert or changing a task's status. It serves as a benchmark or threshold for evaluating whether tasks on the checklist have been completed within an expected timeframe or operational phase. The trigger point can be defined based on various factors, including an elapsed amount of time, a particular flight phase, or a combination of both. In an example embodiment, the trigger point is based on an elapsed amount of time, it represents a set duration from when a checklist was initiated, such as 5 minutes from engine start or 10 minutes into a specific procedure. If the task remains incomplete beyond this elapsed amount of time, the system may activate an auditory alert, a visual indicator, or the strobe light to notify the pilot of the pending task. In another embodiment, the trigger point can be based on elapsed flight phases, such as takeoff, climb, cruise, descent, or landing. In this context, if a certain checklist task is not completed by the end of a designated phase (e.g., takeoff phase), the system will recognize it as unmet and generate an appropriate alert.

In another embodiment, a computing device is connected via the wireless communication module so that the audio output means emits a second sound to a sound emitting device of the computing device when one of the plurality of tasks of the first checklist is in the incomplete state after the predetermined trigger point. The sound emitting device of the computing device is a component designed to deliver clear and audible feedback to the pilot, enhancing communication and checklist management. It includes elements such as internal speakers, external speaker ports, headphone jacks, or Bluetooth-enabled audio devices, which are capable of producing distinct sound alerts and prompts. The sound emitted is tailored to provide real-time feedback, including task completion notifications, warning sounds, reminders for incomplete tasks, or other critical system alerts.

In further embodiments, the system incorporates flight data logging and analysis capabilities, providing a black box functionality that records crucial flight parameters such as speed, altitude, position, and engine performance. This data is stored in the system's memory and can be downloaded post-flight for detailed analysis, allowing pilots to review their performance, identify potential issues, and maintain a comprehensive flight log for training or regulatory compliance.

The system also offers advanced safety alerts and reminders. It can generate critical alerts, such as low fuel warnings, high engine temperature alerts, or stall warnings, by integrating with aircraft avionics systems. These alerts are delivered as both visual cues on the graphical display and audible notifications via the audio output, ensuring timely pilot response to urgent situations. Additionally, the system can provide task reminders based on time or flight phase. These reminders are designed to prompt pilots to verify specific systems or complete necessary tasks, such as switching fuel tanks or deploying landing gear, helping to maintain checklist compliance during all phases of flight.

The invention also promotes pilot health and wellness by incorporating features that monitor pilot alertness. For instance, the system can issue prompts that require user interaction, helping gauge pilot focus and alertness. When paired with wearable devices, the system can monitor biometric data to track stress levels or fatigue. The stress and fatigue tracker feature can recommend breaks or hydration, particularly on longer flights, enhancing pilot well-being and reducing the risk of fatigue-related errors.

The system further includes enhanced connectivity and collaboration features. Through cloud synchronization, pilots can store, manage, and access checklists, flight logs, and other data from connected devices like mobile phones, tablets, or PCs. This cloud-based connectivity allows for seamless data management before, during, and after flights. Additionally, the system supports crew collaboration, enabling real-time sharing of checklists and tasks among crew members on separate devices, improving coordination and workload distribution in multi-pilot operations.

In another embodiment, the system offers an interactive training mode that simulates real-flight scenarios, allowing pilots to practice following checklists under simulated conditions. This mode is particularly useful for student pilots or experienced pilots training in emergency procedures, providing a realistic yet controlled environment for developing and refining checklist management skills.

These additional embodiments demonstrate the system's versatility and adaptability, making it not only a tool for managing routine flight operations but also a comprehensive solution that supports safety, pilot wellness, training, and collaboration. By integrating these features, the system offers a holistic approach to checklist management, enhancing both flight safety and pilot efficiency across diverse aviation scenarios.

Beyond its primary application in aviation, the system described herein can be adapted for use in a wide range of industries and operational environments, serving as a versatile checklist and task management tool. The following embodiments demonstrate its broad applicability:

In manufacturing and industrial operations, the system can be used by quality control inspectors to ensure that all steps in a production process are followed correctly. It can also be employed by industrial safety officers to manage routine safety checks and regulatory compliance, and by maintenance teams to confirm that machinery and equipment are regularly inspected, maintained, and repaired according to a predefined schedule.

In the healthcare and medical fields, the system can serve as a vital tool for surgical checklists, assisting surgeons and operating room staff in managing pre-operative and post-operative procedures. It can also support patient care routines by tracking medication schedules and daily check-ins for nurses and healthcare providers, while medical technicians can use it to log maintenance checks on critical medical devices.

For construction and engineering, the system facilitates site safety inspections, helping construction managers ensure that safety protocols are followed and equipment remains compliant. It can also be used for building inspections, tracking progress and adherence to construction regulations, as well as for project management, enabling engineers to track tasks and meet critical milestones.

In logistics and supply chain management, the system can enhance inventory management by helping warehouse operators conduct audits and manage stock flow. It can also assist logistics managers in tracking vehicle maintenance and driver checklists, while dock supervisors can use it to manage shipping and receiving procedures.

The system's functionality extends to transportation and fleet management, where it can support railway operations by assisting train conductors or engineers in tracking safety procedures and pre-departure checks. In the maritime industry, ship crews can use it to manage maintenance and compliance drills, while public transport operators can employ it to manage vehicle maintenance and driver shifts.

In the hospitality and facility management sectors, the system can ensure adherence to room preparation, maintenance, and housekeeping protocols in hotels and resorts. It is also useful in event planning, helping organizers track event setup, coordination, and teardown, as well as in facility maintenance, where managers can use it to conduct routine inspections of HVAC, electrical, and plumbing systems.

For the food and beverage industry, the system supports restaurant operations by ensuring that food preparation and service comply with health and safety standards. It can also assist food safety inspectors in monitoring compliance, while restaurant managers can use it for inventory management, tracking stock levels, expiration dates, and replenishment schedules.

In emergency services and public safety, the system can aid firefighters in verifying equipment checks before, during, and after emergencies. It is also suitable for police and security operations, where officers can use it to ensure equipment readiness and adherence to procedural checklists, and for search and rescue teams, managing mission-critical tasks and tracking progress.

In energy and utilities, the system can be utilized for power plant maintenance, ensuring regular inspections and safety checks. It is also valuable for pipeline and infrastructure inspections, helping workers monitor pipeline integrity, detect leaks, and ensure environmental compliance.

In the mining and extraction industry, the system can support mine safety checks, ensuring compliance with safety procedures and equipment inspections. It is also effective for managing and logging maintenance tasks for heavy machinery used in mining operations.

For education and training, the system can help teachers and staff manage daily or weekly administrative tasks and support student training in vocational or technical programs by guiding students through step-by-step procedures in hands-on lessons or labs.

In environmental and agricultural applications, the system can assist in farm management, helping farmers track planting, harvesting, irrigation schedules, and machinery maintenance. It can also be employed in environmental monitoring, enabling inspectors to ensure compliance with ecosystem management and pollution control procedures.

In the automotive industry, the system is useful for service and repair, allowing mechanics to track vehicle maintenance, repairs, and quality assurance checks. It can also be applied to assembly line management, helping manufacturers ensure adherence to quality control measures.

Lastly, in aerospace and defense, the system can support aircraft maintenance by tracking service intervals and confirming all pre-flight and post-flight checks. It is also applicable to military operations, where personnel can use it for equipment checks, mission readiness protocols, and safety checklists.

These embodiments illustrate the system's adaptability across diverse sectors, making it not only a comprehensive solution for aviation but also a versatile tool for managing tasks, ensuring compliance, and enhancing operational safety across industries. The system's customizability, real-time logging, and multi-device connectivity contribute to its effectiveness in a wide range of applications, supporting both routine operations and critical procedures.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for providing a plurality of checklists to a pilot, the system comprising:
a housing enclosing a plurality of system components;
a power source;
a processor in electrical communication with the power source;
a database, in connection with the processor, the database configured for storing the plurality of checklists, a plurality of airplane profiles, and a plurality of event logs;
a wireless communication module configured to enable data transfer between the processor and a remote computing device;
an interface, in connection with the processor, wherein the interface is configured to receive input from a user related to the plurality of checklists and the plurality of airplane profiles;
a graphical display for displaying a first checklist of the plurality of checklists; and
an audio output means in connection with the processor configured to provide audio feedback;
wherein the processor is configured for:
 executing a plurality of software instructions for managing and displaying the plurality of checklists related to each of the plurality of airplane profiles;
a first dial disposed on the housing and connected to the processor;
 wherein, if the first dial is rotated, then the processor causes the graphical display to switch between a graphical representation of at least a first airplane profile of the plurality of airplane profiles and a graphical representation of at least a second airplane profile of the plurality of airplane profiles;
 wherein, after the processor receives input, via the interface, of a selection of at least one of the first airplane profile and the second airplane profile, then, if the first dial is rotated, then the processor causes the graphical display to switch between a graphical representation of at least a first checklist of the plurality of checklists and a graphical representation of at least a second checklist of the plurality of checklists;
a second dial on the housing and connected to the processor;
 wherein, if the second dial is rotated, then the processor causes the graphical display to switch between a graphical representation of at least a first task of a plurality of tasks and a graphical representation of a second task of the plurality of tasks;
the graphical display, being a touchscreen display, disposed on the housing in a horizontal manner;
wherein the processor is further configured to:
 cause the graphical display to visually present a plurality of tasks from the first checklist;
  wherein a first task of the plurality of tasks is displayed visually separate from an adjacent task of the plurality of tasks;
  wherein each of the plurality of tasks from the first checklist is associated with a first indicator graphically representing an incomplete state and a second indicator graphically representing a completed state; and
 change a visual representation of the first task from the first indicator to the second indicator when the touchscreen display receives a gesture input indicating that the first task has been completed; and
wherein the second dial is configured to be depressed, and wherein if (i) one or more tasks of the plurality of tasks on the graphical display is displaying the second indicator graphically representing the completed state and (ii) if the second dial is depressed, then the processor causes the one or more tasks of the plurality of tasks to be reset so that the graphical display shows the one or more tasks of the plurality of tasks as the first indicator graphically representing the incomplete state.

2. The system of claim 1, wherein the system further comprises:
a button disposed on the housing that is connected to the processor;
wherein if the button is depressed, then the processor is configured to automatically display a plurality of emergency checklists on the graphical display;
wherein, if the first dial is rotated after the button is depressed, then the processor causes the graphical display to switch between a graphical representation of at least a first emergency checklist of the plurality of emergency checklists and a graphical representation of at least a second emergency checklist of the plurality of emergency checklists.

3. The system of claim 1, wherein the processor is further configured to:
cause the audio output means to emit a sound when one of the plurality of tasks of the first checklist is in the incomplete state after a predetermined trigger point.

4. The system of claim 3, wherein the predetermined trigger point comprises at least one of elapsed amount of time and an elapsed flight phase.

5. The system of claim 3, wherein the incomplete state occurs when the processor fails to receive the gesture input for at least one of the plurality of tasks for the first checklist.

6. The system of claim 3, wherein a computing device is connected via the wireless communication module so that the audio output means emits a second sound to a sound emitting device of the computing device when one of the plurality of tasks of the first checklist is in the incomplete state after the predetermined trigger point.

7. The system of claim 3, wherein the system further comprises:
a strobe light emitting apparatus disposed on the housing;
when one of the plurality of tasks of the first checklist is in the incomplete state after the predetermined trigger point, then the processor is configured to cause the strobe light emitting apparatus to emit light in a pattern.

8. The system of claim 1, wherein the gesture input comprises a predefined motion on the touchscreen display comprising at least one of a tap, swipe, press, and multi-touch gesture.

9. A system for providing a plurality of checklists to a pilot, the system comprising:
a housing enclosing a plurality of system components;
a power source;
a processor in electrical communication with the power source;
a database, in connection with the processor, the database configured for storing the plurality of checklists, a plurality of airplane profiles, and a plurality of event logs;
a wireless communication module configured to enable data transfer between the processor and a remote computing device;
an interface, in connection with the processor, wherein the interface is configured to receive input from a user related to the plurality of checklists and the plurality of airplane profiles;
a graphical display for displaying at least a first checklist of the plurality of checklists; and
an audio output means in connection with the processor configured to provide audio feedback;
a button disposed on the housing that is connected to the processor;
a first dial disposed on the housing and connected to the processor;
wherein the processor is configured for:
executing a plurality of software instructions for managing and displaying the plurality of checklists related to each of the plurality of airplane profiles;
wherein, if the first dial is rotated, then the processor causes the graphical display to switch between a graphical representation of at least a first airplane profile of the plurality of airplane profiles and a graphical representation of at least a second airplane profile of the plurality of airplane profiles;
wherein, after the processor receives input, via the interface, of a selection of at least one of the first airplane profile and the second airplane profile, then, if the first dial is rotated, then the processor causes the graphical display to switch between a graphical representation of at least a first checklist of the plurality of checklists and a graphical representation of at least a second checklist of the plurality of checklists;
wherein if the button is depressed, then the processor is configured to automatically display a plurality of emergency checklists on the graphical display; and
wherein, if the first dial is rotated after the button is depressed, then the processor causes the graphical display to switch between a graphical representation of at least a first emergency checklist of the plurality of emergency checklists and a graphical representation of at least a second emergency checklist of the plurality of emergency checklists;
a second dial disposed on the housing and connected to the processor;
wherein, if the second dial is rotated, then the processor causes the graphical display to switch between a graphical representation of at least a first task of a plurality of tasks and a graphical representation of at least a second task of a plurality of tasks;
the graphical display, being a touchscreen display, disposed on the housing in a horizontal manner;
wherein the processor is further configured to:
cause the graphical display to visually present a plurality of tasks from the first checklist;
wherein a first task of the plurality of tasks is displayed visually separate from an adjacent task of the plurality of tasks;
wherein each of the plurality of tasks from the first checklist is associated with a first indicator graphically representing an incomplete state and a second indicator graphically representing a completed state; and
change a visual representation of the first task from the first indicator to the second indicator when the touchscreen display receives a gesture input indicating that the task has been completed; and
wherein the second dial is configured to be depressed, and wherein if (i) one or more tasks of the plurality of tasks on the graphical display is displaying the second indicator graphically representing the completed state and (ii) if the second dial is depressed, then the processor causes the one or more tasks of the plurality of tasks to be reset so that the graphical display shows the one or more tasks of the plurality of tasks as the first indicator graphically representing the incomplete state.

10. The system of claim 9, wherein the processor is further configured to:
cause the audio output means to emit a sound when one of the plurality of tasks of the first checklist is in the incomplete state after a predetermined trigger point.

11. The system of claim 10, wherein the predetermined trigger point comprises at least one of elapsed amount of time and an elapsed flight phase.

12. The system of claim 11, wherein the incomplete state occurs when the processor fails to receive the gesture input for at least one of the plurality of tasks for the first checklist.

* * * * *